US010372025B2

(12) United States Patent
Matsumoto et al.

(10) Patent No.: US 10,372,025 B2
(45) Date of Patent: Aug. 6, 2019

(54) OPTICAL DEVICE AND PROJECTOR

(71) Applicant: SEIKO EPSON CORPORATION, Tokyo (JP)

(72) Inventors: Kensaku Matsumoto, Matsumoto (JP); Kaname Nagatani, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/815,286

(22) Filed: Nov. 16, 2017

(65) Prior Publication Data
US 2018/0149952 A1 May 31, 2018

(30) Foreign Application Priority Data

Nov. 25, 2016 (JP) .................. 2016-228640
Nov. 28, 2016 (JP) .................. 2016-228641

(51) Int. Cl.
*G03B 21/16* (2006.01)
*F28D 15/00* (2006.01)
*G02F 1/1333* (2006.01)
*G03B 21/14* (2006.01)
*G03B 21/00* (2006.01)

(52) U.S. Cl.
CPC ............ *G03B 21/16* (2013.01); *F28D 15/00* (2013.01); *G02F 1/133382* (2013.01); *G03B 21/145* (2013.01); *G02F 2203/01* (2013.01); *G03B 21/006* (2013.01)

(58) Field of Classification Search
CPC ..... G02F 1/13; G03B 21/008; G03B 21/2033; G03B 21/26; G03B 21/16; G03B 21/2053; H05K 7/20; H04N 9/3105; H04N 9/3111; H04N 9/3155

USPC ................................ 353/54; 349/5
See application file for complete search history.

(56) References Cited

U.S. PATENT DOCUMENTS 7,320,523 B2   1/2008   Ohkubo et al.
7,556,383 B2   7/2009   Utsunomiya
(Continued)

FOREIGN PATENT DOCUMENTS

JP   2005-326660 A   11/2005
JP   2006-106250 A    4/2006
(Continued)

OTHER PUBLICATIONS

Jan. 25, 2018 Office Action Issued in U.S. Appl. No. 15/815,213.

*Primary Examiner* — Steven H Whitesell Gordon
*Assistant Examiner* — Jerry Brooks
(74) *Attorney, Agent, or Firm* — Oliff PLC

(57) ABSTRACT

An optical device includes a light modulation device disposed on an optical axis of incident light, and a holding section configured to hold the light modulation device. The holding section includes an inflow part to which a liquid supplied from an outside of the holding section inflows, a flow channel forming part disposed along a circumferential edge of the light modulation device so as to have an annular shape, and having a flow channel through which the liquid flowed from the inflow part circulates, and an outflow part from which the liquid having flowed through the flow channel outflows to the outside of the holding section. At least one of an inside of the inflow part and an inside of the flow channel is provided with at least one projection.

18 Claims, 14 Drawing Sheets

(56) References Cited

U.S. PATENT DOCUMENTS

| | | | |
|---|---|---|---|
| 2005/0162760 A1* | 7/2005 | Fujimori | H04N 9/3141 359/820 |
| 2005/0213018 A1* | 9/2005 | Hoshino | G02F 1/133385 349/161 |
| 2005/0213228 A1 | 9/2005 | Fujimori et al. | |
| 2005/0220156 A1 | 10/2005 | Kitabayashi | |
| 2005/0270495 A1 | 12/2005 | Ohkubo et al. | |
| 2006/0092382 A1* | 5/2006 | Kinoshita | G03B 21/16 353/54 |
| 2006/0209266 A1 | 9/2006 | Utsunomiya | |

FOREIGN PATENT DOCUMENTS

| | | |
|---|---|---|
| JP | 2006-259282 A | 9/2006 |
| JP | 2007-322637 A | 12/2007 |
| JP | 2011-197390 A | 10/2011 |
| JP | 2014-149510 A | 8/2014 |

\* cited by examiner

OPTICAL DEVICE AND PROJECTOR

BACKGROUND

1. Technical Field

The present invention relates to an optical device and a projector.

2. Related Art

In the past, there has been known a projector which modulates light emitted from a light source device in accordance with image information to project an image on a projection surface such as a screen. Further, in recent years, there has been known a projector provided with a light source device for emitting light higher in luminance in order to make it possible to project a brighter image. Further, in such a projector, since the heat generation of an optical element, which the light emitted from the light source device enters, becomes conspicuous, there has been proposed a technology of cooling the optical element using a liquid (see, e.g., JP-A-2011-197390 (Document 1)).

The projector described in Document 1 is provided with an optical device having the optical element (a liquid crystal panel) and a liquid cooling device. In addition to the liquid crystal panel, the optical device is provided with an optical element holder for holding the liquid crystal panel.

The optical element holder is provided with a panel support frame having an opening part to support the liquid crystal panel, and a liquid circulation tube. The liquid circulation tube is bent to have a U-shape, and is formed so as to surround an image forming area of the liquid crystal panel in three directions in a planar view, and the liquid circulates through the liquid circulation tube. The panel support frame is provided with an incident-side support frame and an exit-side support frame for holding the liquid circulation tube on the both sides.

The liquid cooling device is provided with a liquid pressure-feeding section, a tank, a heat exchange unit, and a plurality of liquid circulating members, and circulates the liquid through the liquid circulation tube.

However, in the technology described in Document 1, since the liquid circulation tube is formed so as to surround the image forming area of the liquid crystal panel in the three directions and thus the liquid is not circulated in one remaining direction, there is a problem that cooling becomes insufficient. Therefore, in order to improve the cooling performance, there can be cited a method of thickening the liquid circulation tube to increase the flow rate of the liquid, and a method of increasing the bending parts of the liquid circulation tube to configure the liquid circulation tube so as to surround the image forming area in roughly four directions, but there arises the following problems. That is, if the liquid circulation tube is made thicker, there is a problem that the optical element holder, and by extension, the optical device grows in size. If the number of the bending parts of the liquid circulation tube is increased, in addition to the difficulty in working the liquid circulation tube, it is necessary to circulate the liquid with high pressure, and thus, a high power device is required for the liquid pressure-feeding section, and at the same time, the pressure loss increases. If the pressure loss increases, volatilization and leakage of the liquid from a gap between connection members for circulating the liquid become apt to occur. Therefore, there is a problem that there is a possibility that the leaked liquid adheres to other members in the projector to cause a trouble, and that the liquid accumulated needs to be increased, and thus, the tank grows in size.

SUMMARY

An advantage of some aspects of the invention is to solve at least a part of the problems described above, and the invention can be implemented as the following forms or application examples.

An optical device according to this application example includes an optical element disposed on an optical axis of incident light, and a holding section configured to hold the optical element, the holding section includes an inflow part to which a liquid supplied from an outside of the holding section inflows, a flow channel forming part disposed along a circumferential edge of the optical element so as to have an annular shape, and having a flow channel through which the liquid flowed from the inflow part circulates, and an outflow part from which the liquid having flowed through the flow channel outflows to the outside of the holding section, and at least one of an inside of the inflow part and an inside of the flow channel is provided with at least one projection.

According to this configuration, since in the optical device, the holding section for holding the optical element is provided with the inflow part, the flow channel forming part having the flow channel, and the outflow part described above, by supplying the liquid to the inflow part, the liquid can be circulated through the flow channel. Thus, the optical element generating the heat due to the incident light is efficiently cooled. Specifically, since the flow channel is configured to have an annular shape along the circumferential edge of the optical element, it becomes possible to transfer the heat of the optical element from the area surrounding the optically effective area where the light of the optical element enters to the liquid. Further, since the members intervening between the optical element and the liquid are reduced compared to the configuration of circulating the liquid using different members (e.g., pipe-like members) from the holding section, it becomes possible to efficiently transfer the heat of the optical element to the liquid.

Therefore, since the rise in temperature of the optical element can efficiently be suppressed, the deterioration of the optical element is suppressed, and it becomes possible to provide the optical device capable of surely exerting the optical characteristics provided to the optical element.

Further, since the optical device can be formed of a smaller number of components compared to the configuration of circulating the liquid using different embers from the holding sections, it becomes possible to provide the optical device making it possible to reduce the manufacturing man-hour and the component cost and to reduce the device size.

Further, since the projection is provided to at least one of the inside of the inflow part and the inside of the flow channel, it becomes possible to generate a turbulent flow due to the collision of the liquid flowing therein from the inflow part with the projection. Since the turbulent flow is hard to cause the thermal boundary layer caused in the laminar flow, it is possible to achieve the heat exchange between the inner wall of the inflow part or the inner wall of the flow channel and the liquid in good condition. Further, since it is possible to increase the surface area of the holding section in the flow channel by providing the projections to the holding section, it becomes possible to improve the radiation performance of the holding section. Therefore, it becomes possible to provide the optical device in which the optical element is more efficiently cooled.

In the optical device according to the application example described above, it is preferable that a plurality of first projections is disposed along a circulation direction of the liquid, a plurality of second projections is disposed along the circulation direction, and is different from the plurality of first projections, and the plurality of first projections and the plurality of second projections are arranged so as to be shifted from each other viewed from the circulation direction, and are arranged so as to be shifted from each other viewed from a direction perpendicular to both the circulation direction and a direction in which the plurality of first projections and the plurality of second projections project.

According to this configuration, the plurality of first projections and the plurality of second projections are disposed so as to be shifted from each other viewed from the circulation direction of the liquid, and are disposed so as to be shifted from each other viewed from the direction perpendicular to the circulation direction and the projection direction of the projections. Thus, it becomes possible to efficiently guide the turbulent flow to the region where the thermal boundary layer is caused in the laminar flow. Therefore, it becomes possible to provide the optical device in which the optical element is more efficiently cooled.

In the optical device according to the application example described above, it is preferable that the flow channel includes a first flow channel part and a fourth flow channel part disposed so as to be opposed to each other, the first flow channel extending in a first direction, the fourth flow channel extending in a third direction opposite to the first direction, and a second flow channel part and a third flow channel part disposed so as to be opposed to each other and extending in a second direction crossing the first direction, the first flow channel part, the second flow channel part, the third flow channel part, and the fourth flow channel part are connected so as to form an annular shape, and the at least one projection is disposed inside the flow channel.

According to this configuration, since the first flow channel part through the fourth flow channel part constitute the flow channel having an annular shape, it becomes possible to dispose the flow channel closer to an optically effective area with respect to the optical element having the optically effective area having a rectangular shape. Further, since the projections are disposed inside the flow channel, it becomes possible to dispose the projections corresponding to the parts where the thermal boundary layer is apt to occur in the laminar flow in the flow channel having an annular shape. Therefore, since it becomes possible to more efficiently transfer the heat of the optical element to the liquid, it becomes possible to provide the optical device capable of more strongly suppressing the rise in temperature of the optical element.

In the optical device according to the application example described above, it is preferable that length of the second flow channel part and length of the third flow channel part are respectively larger than each of length of the first flow channel part and length of the fourth flow channel part, and the at least one projection is provided to at least one of the second flow channel part and the third flow channel part.

According to this configuration, the flow channel is formed to have a rectangular planar shape in which the second flow channel part and the third flow channel part are longer than the first flow channel part and the fourth flow channel part, and the projection is provided to at least one of the second flow channel part and the third flow channel part extending in the longitudinal direction in the flow channel having the rectangular planar shape. Thus, it becomes possible to suppress the occurrence of the thermal boundary layer in the second flow channel part and the third flow channel part which is apt to occur in a broader range than in the first flow channel part and the fourth flow channel part in the laminar flow. Therefore, it becomes possible to provide the optical device, which is provided with the optical element having the optically effective area having an oblong shape, and in which the rise in temperature of the optical element is efficiently suppressed.

In the optical device according to the application example described above, it is preferable that the holding section includes a first frame and a second frame disposed so as to be opposed to each other in a direction along the optical axis, and bonded to each other to thereby form the flow channel, and the at least one projection is provided to one of the first frame and the second frame.

According to this configuration, it is possible to form the holding section having the flow channel and the projection by providing the projection to one of the first frame and the second frame, and then connecting the first frame and the second frame to each other. Therefore, even in the configuration of having the flow channel through which the liquid circulates, it is possible to form the holding section having the projection with easy working, and while suppressing the increase in manufacturing man-hour.

In the optical device according to the application example described above, it is preferable that the first frame and the second frame are each formed of a thermally-conductive material, and the at least one projection thermally-conductably contacts with the other of the first frame and the second frame.

According to this configuration, one of the first frame and the second frame of the holding section is located on the optical element side, and the holding section is disposed one of the light incident side and the light exit side of the optical element to hold the optical element. Further, inside the inflow part or inside the flow channel, there is disposed a heat transferring projection projecting from one of the first frame and the second frame, and having contact with the other thereof so that the heat conduction can be achieved. Thus, it becomes possible to transfer the heat of one of the first frame and the second frame, which is disposed on the optical element side, and to which the heat of the optical element has been transferred, to the other using the heat transferring projection. Therefore, it becomes possible to generate the turbulent flow and at the same time improve the radiation performance of the holding section using the heat transferring projection.

An optical device according to this application example includes an optical element disposed on an optical axis of incident light, and a holding section configured to hold the optical element, the holding section includes an inflow part to which a liquid supplied from an outside of the holding section inflows, a flow channel forming part disposed along a circumferential edge of the optical element so as to have an annular shape, and having a flow channel through which the liquid flowed from the inflow part circulates, and an outflow part from which the liquid having flowed through the flow channel outflows to the outside of the holding section, and the inflow part and the outflow part are disposed on a same side with respect to the flow channel forming part.

According to this configuration, since in the optical device, the holding section for holding the optical element is provided with the inflow part, the flow channel forming part having the flow channel, and the outflow part described above, by supplying the liquid to the inflow part, the liquid can be circulated through the flow channel. Thus, the optical element generating the heat due to the incident light is efficiently cooled. Specifically, since the flow channel is configured to have an annular shape along the circumferential edge of the optical element, it becomes possible to transfer the heat of the optical element from the area surrounding the optically effective area, where the light of the optical element enters, to the liquid. Further, since the members intervening between the optical element and the liquid are reduced compared to the configuration of circulating the liquid using different members (e.g., pipe-like members) from the holding section, it becomes possible to efficiently transfer the heat of the optical element to the liquid.

Therefore, since the rise in temperature of the optical element can efficiently be suppressed, the deterioration of the optical element is suppressed, and it becomes possible to provide the optical device capable of surely exerting the optical characteristics provided to the optical element.

Further, since the optical device can be formed of a smaller number of components compared to the configuration of circulating the liquid using different members from the holding sections, it becomes possible to provide the optical device making it possible to reduce the manufacturing man-hour and the component cost and to reduce the device size.

Further, since the inflow part and the outflow part are formed on the same side with respect to the flow channel forming part, it becomes possible to compactly dispose the members to be connected respectively to the inflow part and the outflow part in order to circulate the liquid through the flow channel. Therefore, it becomes possible to provide the optical device capable of making a contribution to the miniaturization of a device and equipment equipped with the optical device.

In the optical device according to the application example described above, it is preferable that the flow channel includes a first flow channel part configured to circulate, in a first direction, a part of the liquid flowed from the inflow part, a second flow channel part configured to circulate, in a second direction crossing the first direction, a rest of the liquid flowed from the inflow part, a third flow channel part configured to circulate, in the second direction, a liquid flowed through the first flow channel part, and a fourth flow channel part configured to circulate, in a third direction opposite to the first direction, a liquid flowed through the third flow channel part, and the outflow part outflows a liquid obtained by combining a liquid circulated through the second flow channel part and a liquid circulated through the fourth flow channel part.

According to this configuration, the flow channel having an annular shape is constituted by the first flow channel part through the fourth flow channel part. Thus, with respect to the optical element having the optically effective area having a rectangular shape, it becomes possible to dispose the flow channel closely to the optically effective area. Therefore, since it becomes possible to more efficiently transfer the heat of the optical element to the liquid, it becomes possible to provide the optical device capable of more strongly suppressing the rise in temperature of the optical element.

In the optical device according to the application example described above, it is preferable that the second flow channel part includes a narrowed part where the second flow channel part is partially narrowed.

According to this configuration, the liquid having flowed therein from the inflow part flows through a first path in which the liquid flows along the first flow channel part, the third flow channel part, and the fourth flow channel part, and a second path in which the liquid flows along the second flow channel part and is then combined with the liquid having flowed through the fourth flow channel part, and then flows through the outflow part. Therefore, the first path is formed longer than the second path.

Therefore, since the liquid flowing through the first path gradually rises in temperature as proceeding along the first flow channel part, the third flow channel part, and the fourth flow channel part, the temperature of the liquid flowing through the fourth flow channel part becomes higher than the temperature of the liquid flowing through the first flow channel part or the second flow channel part. In the configuration not provided with the narrowed part, the temperature difference becomes conspicuous. Specifically, in the configuration not provided with the narrowed part, the region the highest in temperature is shifted from the center of the surface toward the fourth flow channel part in the temperature distribution of the surface of the optical element.

In contrast, according to the present configuration, since the second flow channel part is provided with the narrowed part where the second flow channel part is partially narrowed, the flow rate of the liquid circulating through the second flow channel part becomes lower, and therefore, the heat of the optical element is transferred in larger amounts. Thus, the temperature difference between the temperature of the liquid flowing through the fourth flow channel part and the temperature of the liquid flowing through the second flow channel part decreases, and therefore, the temperature distribution of the surface of the optical element becomes balanced one in which the region the highest in temperature comes closer to the center of the surface. Therefore, in the optical element, the deviation in the surface of the optical characteristics for converting the state of the incident light is suppressed.

In the optical device according to the application example described above, it is preferable that the flow channel includes a detour part configured to detour, in the first direction, at least a part of a liquid flowed through the second flow channel part and configured to combine the detoured liquid with a liquid flowing through the fourth flow channel part.

In the configuration not provided with the detour part, similarly to the configuration not provided with the narrowed part described above, the temperature of the liquid flowing through the fourth flow channel part is higher than the temperature of the liquid flowing through the first flow channel part or the second flow channel part, and the temperature difference therebetween becomes conspicuous.

According to this configuration, since the detour part described above is provided to the flow channel, at least a part of the liquid having flowed through the second flow channel part (the second path) enters the fourth flow channel part to be combined with the liquid having reached the fourth flow channel part through the first path. Thus, the temperature of the liquid in the fourth flow channel part becomes lower than the temperature of the liquid in the fourth flow channel part of the configuration not provided with the detour part. Therefore, the fourth flow channel part side of the optical element is more efficiently cooled, and at the same time, the temperature distribution of the surface of the optical element comes closer to the center, and thus, becomes more balanced one. Therefore, in the optical element, the rise in temperature is further suppressed, and at the same time, the deviation in the surface of the optical characteristics is further suppressed.

In the optical device according to the application example described above, it is preferable that the optical element is a light modulation device configured to modulate the incident light.

According to this configuration, since the light modulation device as the optical element is efficiently cooled by the liquid having flowed into the holding section, and is therefore prevented from rising in temperature. Therefore, it becomes possible to provide the optical device provided with the optical element for exerting the own optical characteristics for a long period of time to modulate the incident light.

A projector according to this application example includes a light source configured to emit light, the optical device according to any one of the application examples described above, which the light emitted from the light source enters, a projection optical device configured to project an image corresponding to light emitted from the optical device, and a liquid cooling device configured to circulate the liquid through the optical device.

According to this configuration, since the projector is provided with the optical device described above and the liquid cooling device, even in the configuration provided with the light source for emitting high-intensity light, the optical element is efficiently cooled, and projection of bright images and images good in quality becomes possible for a long period of time.

Further, since the degree of freedom of the shape of the flow channel can be increased compared to the configuration of circulating the liquid using different members from the holding section, it becomes possible to circulate the liquid with low pressure. Thus, it becomes possible to achieve miniaturization and reduction in power of the device (e.g., a pump) provided to the liquid cooling device for circulating the liquid.

Further, since it is possible to circulate the liquid with low pressure, it becomes possible to prevent the volatilization and the leakage of the liquid from the connection section between the holding section and the liquid cooling device for circulating the liquid through the optical device, and the connection section in the liquid cooling device. Thus, it is possible to prevent the liquid from adhering to other members in the projector, and at the same time it becomes possible to adopt a configuration provided with a small amount of liquid. Therefore, it becomes possible to provide the projector equipped with the liquid cooling device small in size and low in power consumption.

BRIEF DESCRIPTION OF THE DRAWINGS

The invention will now be described with reference to the accompanying drawings, wherein like numbers reference like elements.

FIG. 21 is a perspective view of an optical device according to a third embodiment of the invention, and tubular members connected to a holding section.

FIG. 22 is a diagram showing a simulation result in the optical device according to the third embodiment.

DESCRIPTION OF EXEMPLARY EMBODIMENTS

Figure 1:
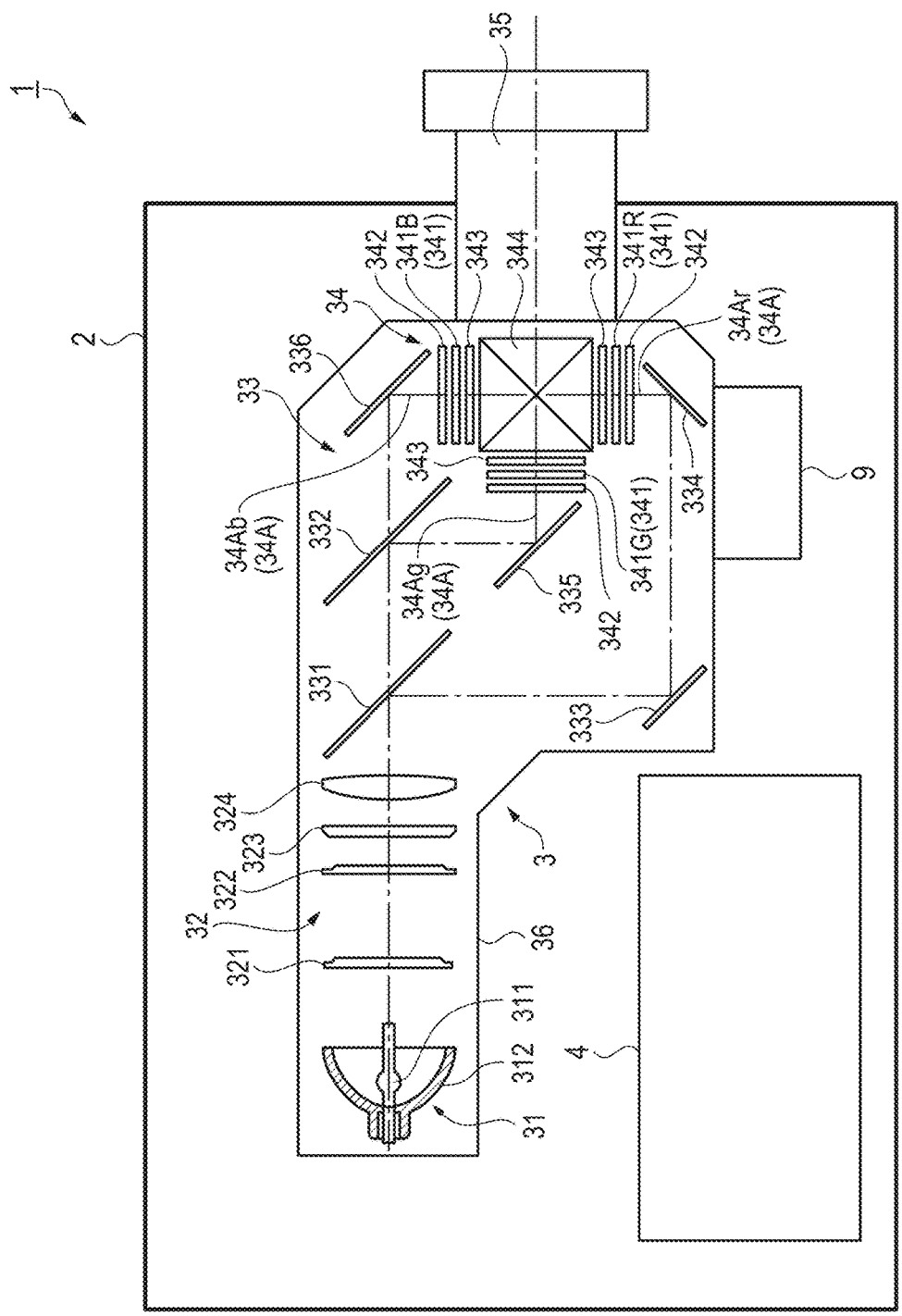
FIG. 1 is a schematic view showing a schematic configuration of a projector according to a first embodiment of the invention.

Hereinafter, projectors according to some embodiments of the invention will be described with reference to the accompanying drawings.

The projector according to the present embodiment modulates the light, which has been emitted from a light source, in accordance with image information, and then projects the light thus modulated on a projection surface such as a screen in an enlarged manner. It should be noted that in the drawings described hereinafter, the dimensions and the ratios of the constituents are arbitrarily made different from actual ones in order to show the constituents with sizes with which the constituents can be recognized in the drawings.

First Embodiment

Principal Configuration of Projector

FIG. 1 is a schematic diagram showing a principal configuration of the projector 1 according to the present embodiment.

As shown in FIG. 1, the projector 1 is provided with an exterior housing 2 constituting the exterior, a control section (not shown), an optical unit 3 including a light source device 31, a liquid cooling device 4, and an air cooling device 9. It should be noted that although not shown in the drawings, the projector 1 is provided with a power supply device for supplying power to the light source device 31, the control section, and so on, an exhaust device for discharging the air heated in the exterior housing 2 to the outside, and so on.

Although not shown in detail in the drawings, the exterior housing 2 is formed of a plurality of members combined with each other. Further, the exterior housing 2 is provided with an air intake port for taking in the external air, an exhaust port for discharging the heated air located inside the exterior housing 2 to the outside, and so on.

The control section is provided with a central processing unit (CPU), a read only memory (ROM), a random access memory (RAM), and so on to thereby function as a computer, and performs control of the operation of the projector 1 such as control related to projection of an image, and control related to drive of the liquid cooling device 4 and the air cooling device 9.

The optical unit 3 optically processes the light emitted from the light source device 31 and then projects the result under the control by the control section.

As shown in FIG. 1, the optical unit 3 is provided with an integrator illumination optical system 32, a color separation optical system 33, an electro-optic device 34 having light modulation devices 341 described later, a cross dichroic prism 344 as a color combining optical device, a projection optical device 35, and an optical component housing 36 for arranging these optical components at predetermined positions on the optical path in addition to the light source device 31.

The light source device 31 is provided with the light source 311 of a discharge type formed of a super-high pressure mercury lamp, a metal halide lamp, or the like, a reflector 312, and so on. The light source device 31 reflects the light, which has been emitted from the light source 311, with the reflector 312 to emit the light toward the integrator illumination optical system 32.

The integrator illumination optical system 32 is provided with a first lens array 321, a second lens array 322, a polarization conversion element 323, and an overlapping lens 324.

The first lens array 321 has a configuration with small lenses arranged in a matrix, and divides the light emitted from the light source device 31 into a plurality of partial light beams. The second lens array 322 has substantially the same configuration as that of the first lens array 321, and roughly overlaps the partial light beams on a surface of each of the light modulation devices 341 in cooperation with the overlapping lens 324. The polarization conversion element 323 has a function of aligning the randomly polarized light emitted from the second lens array 322 into a substantially single polarized light available to the light modulation devices 341.

The color separation optical system 33 is provided with dichroic mirrors 331, 332, and reflecting mirrors 333 through 336, and has a function of separating the light emitted from the integrator illumination optical system 32 into three colors of light of red light (hereinafter referred to as "R light"), green light (hereinafter referred to as "G light"), and blue light (hereinafter referred to as "B light"), and then guiding the three colors of light to the respective light modulation devices 341.

The electro-optic device 34 is provided with the three light modulation devices 341 provided for the respective colored light, incident-side polarization plates 342 and exit-side polarization plates 343 respectively disposed on the light incident side and the light exit side of the respective light modulation devices 341, holding sections 5 (see FIG. 2) for holding the respective light modulation devices 341, and a support section not shown. The light modulation device for the R light is denoted by 341R, the light modulation device for the G light is denoted by 341G, and the light modulation device for the B light is denoted by 341B. The light modulation devices 341R, 341G, and 341B, and the incident-side polarization plates 342, and the exit-side polarization plates 343 for the respective colored light are disposed respectively on the optical axes 34A (the optical axis for the R light is denoted by 34Ar, the optical axis for the G light is denoted by 34Ag, and the optical axis for the B light is denoted by 34Ab) of the respective colored light emitted from the color separation optical system 33. The light modulation devices 341 correspond to the optical elements disposed on the optical axes 34A of the incident light, respectively. Further, the holding section 5 and the light modulation device 341 held by the holding section 5 are defined as an optical device 50.

Figure 2:
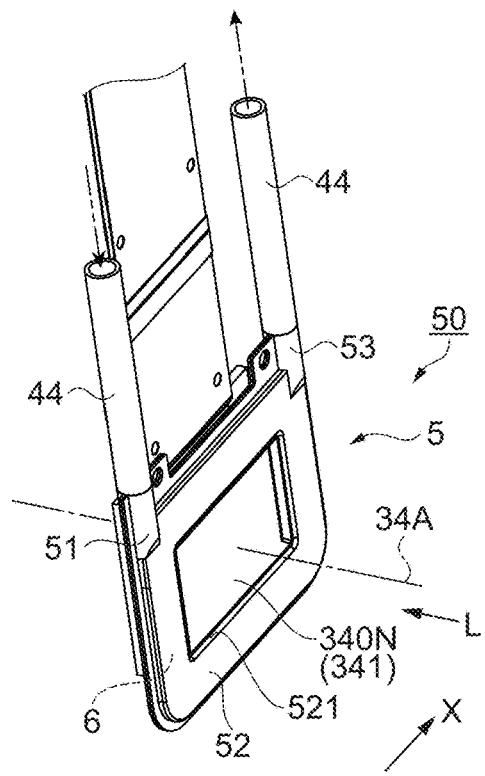
FIG. 2 is a perspective view of an optical device according to the first embodiment, and tubular members connected to a holding section of the optical device viewed from a light incident side.
Figure 3:
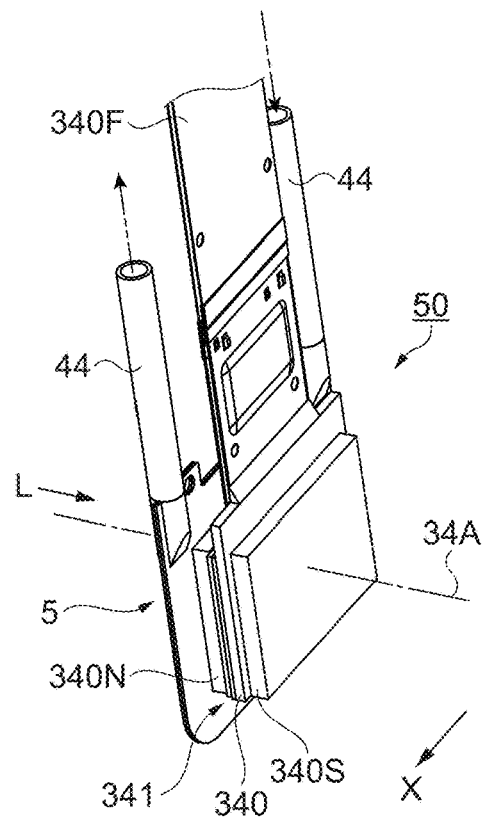
FIG. 3 is a perspective view of a member having the same configuration as shown in FIG. 2 viewed from a light exit side.

FIG. 2 is a perspective view of the optical device 50 and tubular members 44 described later connected to the holding section 5 of the optical device 50 viewed from the light incident side. FIG. 3 is a perspective view of a member having the same configuration as shown in FIG. 2 viewed from the light exit side.

As shown in FIG. 3, each of the light modulation devices 341 is provided with a liquid crystal panel 340 of a transmissive type, dustproof glass members 340N, 340S, and a flexible board 340F.

The liquid crystal panel 340 has an image forming area (not shown) having a rectangular shape which is formed of liquid crystal airtightly encapsulated between an element substrate made of glass or the like and an opposed substrate disposed so as to be opposed to the element substrate, and has minute pixels formed in a matrix. The image forming area forms an optically effective area for forming an image.

The dustproof glass member 340N is disposed on a surface on the light incident side of the liquid crystal panel 340. The dustproof glass member 340S is disposed on a surface on the light exit side of the liquid crystal panel 340.

The dustproof glass members 340N, 340S are formed of, for example, quartz glass, sapphire, or quartz crystal, and prevent the dust from adhering to the surface of the liquid crystal panel 340. Thus, even if the dust adheres to the dustproof glass member 340N or the dustproof glass member 340S, the position of the dust is shifted from the focal position, and therefore, the shadow of the dust is made inconspicuous in the image projected.

The flexible board 340F is connected to the element substrate of the liquid crystal panel 340 at one end, and is connected to the control section at the other end. In the light modulation device 341, a drive signal corresponding to the image information is input from the control section via the flexible board 340F, the orientational state of the liquid crystal in the image forming area is controlled, and thus, the incident colored light is modulated.

As shown in FIG. 2, the holding section 5 is provided with an opening part 521 through which the light L emitted from the incident-side polarization plate 342 (see FIG. 1) passes. The light modulation device 341 of the present embodiment is fixed to the holding section 5 with an adhesive. The holding sections 5 for respectively holding the light modulation devices 341R, 341G, and 341B are denoted by 5R, 5G, and 5B. Although described later in detail, inside the holding section 5, there is disposed a flow channel 6 through which the liquid supplied from the liquid cooling device 4 circulates. Further, the light modulation device 341 is cooled by the liquid circulating between the holding section 5 and the liquid cooling device 4. The holding section 5 will be described later in detail.

Although not described in detail, the support section is formed of a metal sheet or the like, supports the optical device 50, and is attached to the cross dichroic prism 344.

The cross dichroic prism 344 has a substantially rectangular planar shape formed of four rectangular prisms bonded to each other, and on the interfaces on which the rectangular prisms are bonded to each other, there are formed two dielectric multilayer films. In the cross dichroic prism 344, the dielectric multilayer films reflect the R light and the B light modulated by the light modulation devices 341R, 341B while transmitting the G light modulated by the light modulation device 341G to thereby combine the three colors of modulated light with each other.

The projection optical device 35 is provided with a plurality of lenses, and projects the light, which has been combined by the cross dichroic prism 344, on the screen in an enlarged manner.

The liquid cooling device 4 circulates the liquid with the holding section 5 of the optical device 50 to cool the light modulation device 341.

Figure 4:
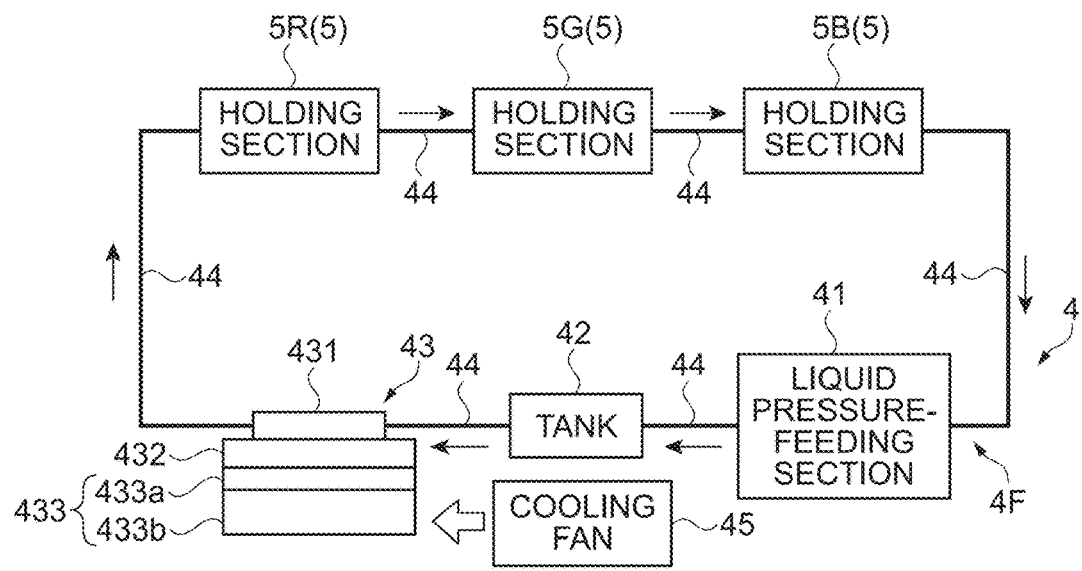
FIG. 4 is a schematic diagram showing a principal configuration of a liquid cooling device of the first embodiment.

FIG. 4 is a schematic diagram showing a principal configuration of the liquid cooling device 4.

As shown in FIG. 4, the liquid cooling device 4 is provided with a liquid pressure-feeding section 41, a tank 42, a heat exchange device 43, a plurality of tubular members 44, and a cooling fan 45. The liquid pressure-feeding section 41, the tank 42, the heat exchange device 43, and the plurality of tubular members 44 form a circulation channel 4F, through which the liquid circulates, in cooperation with the holding sections 5.

The liquid pressure-feeding section 41 is a pump for sucking and pressure-feeding the liquid, and has a suction port for sucking the liquid and an outflow port through which the liquid is pressure-fed. Further, the liquid pressure-feeding section 41 circulates the liquid through the circulation channel 4F.

The tank 42 is formed of a metal material such as aluminum so as to have a hollowed shape with an inflow port through which the liquid inflows, and an outflow port through which the liquid outflows. Further, the tank 42 temporarily stores the liquid inside, and then supplies the liquid to the circulation channel 4F. It should be noted that as the liquid used for the present embodiment, there can be cited water, ethylene glycol, and so on.

As shown in FIG. 4, the heat exchange device 43 is provided with a heat receiving section 431, a thermoelectric conversion element 432, and a heat radiation section 433.

The heat receiving section 431 is provided with a plurality of minute channels (not shown) through which the liquid circulates, an inflow port and an outflow port communicated with the channels, and has a structure of a heat exchanger such as a so-called micro-channel. Further, the heat receiving section 431 receives the heat from the liquid inflowing through the inflow port and flowing through the minute channels.

The thermoelectric conversion element 432 is provided with, for example, a Peltier device having a heat absorbing section and a heat generating section, and the heat absorbing section is connected to the heat receiving section 431. When the power is supplied to the thermoelectric conversion element 432, the heat absorbing section absorbs the heat of the heat receiving section 431, and the heat generating section generates the heat.

The heat radiation section 433 is a so-called heatsink, and is formed of a metal material such as aluminum, and has a base part 433a having a plate-like shape, and a plurality of fins 433b (one of the fins 433b is shown in FIG. 4) projecting from one surface of the base part 433a. The base part 433a of the heat radiation section 433 is connected to the heat generating section of the thermoelectric conversion element 432 to radiate the heat of the heat generating section.

The cooling fan 45 feeds air to the heat radiation section 433 to promote the heat radiation by the heat radiation section 433.

The plurality of tubular members 44 is formed to have a tubular shape, through which the liquid flows, using a material having flexibility, and circularly connects the respective members (the holding sections 5R, 5G, and 5B, the liquid pressure-feeding section 41, the tank 42, and the heat receiving section 431) as shown in FIG. 4 to form the circulation channel 4F together with these members. It should be noted that although in FIG. 4, there is shown the configuration in which the three holding sections 5 (the holding sections 5R, 5G, and 5B) are connected in series to each other, there can also be adopted a configuration in which the three holding sections 5 are connected in parallel to each other. Further, although in FIG. 4, the three holding sections 5 are connected to each other so that the liquid flows through the holding sections 5R, 5G, and 5B in this order, this order is not a limitation.

Although not shown in detail, the air cooling device 9 is provided with a blower fan, a duct member for guiding the air fed by the blower fan to the electro-optic device 34, and so on, and cools the optical components such as the light modulation devices 341, the incident-side polarization plates 342, and the exit-side polarization plates 343. Therefore, the light modulation devices 341 are cooled by the liquid cooling device 4 and the air cooling device 9.

Configuration of Holding Sections

Here, the holding sections 5 in the optical device 50 will be described in detail. The holding sections 5R, 5G, and 5B have a common configuration, and the description will be provided focusing attention on one of the holding sections 5.

Figure 5:
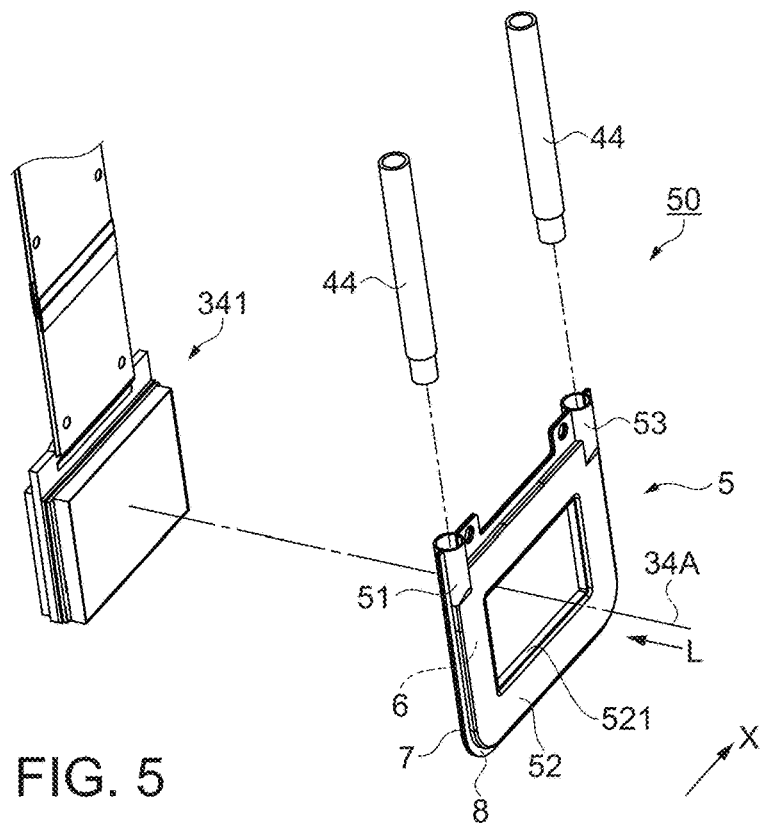
FIG. 5 is an exploded perspective view of the optical device according to the first embodiment, and the tubular members connected to the holding section.
Figure 6:
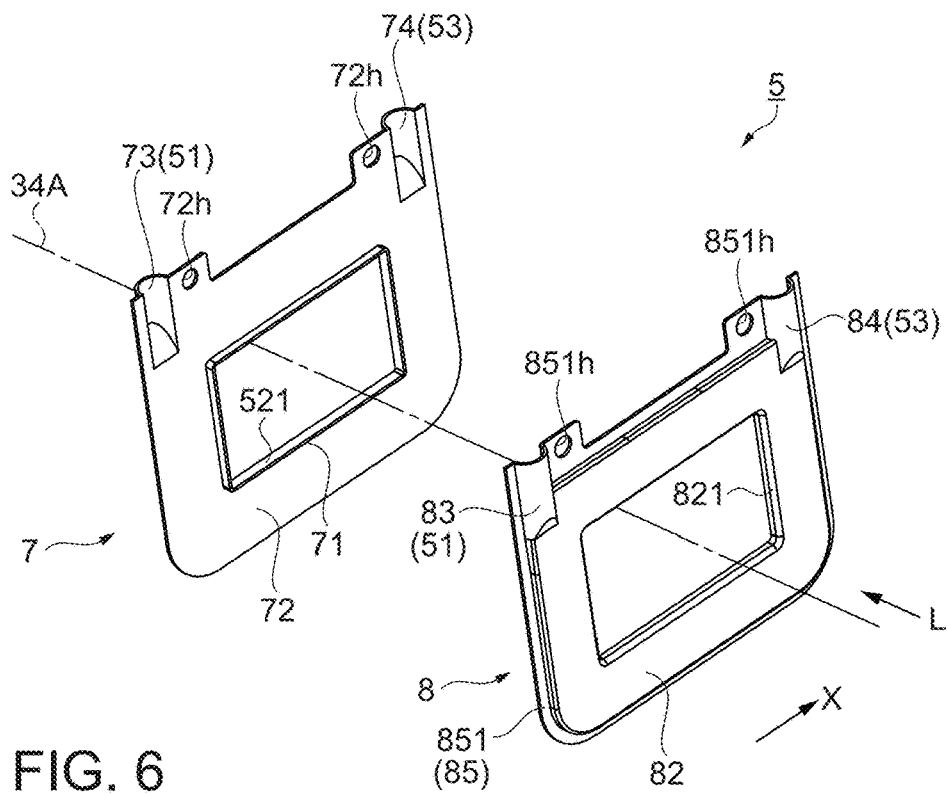
FIG. 6 is an exploded perspective view of the holding section of the first embodiment.
Figure 7:
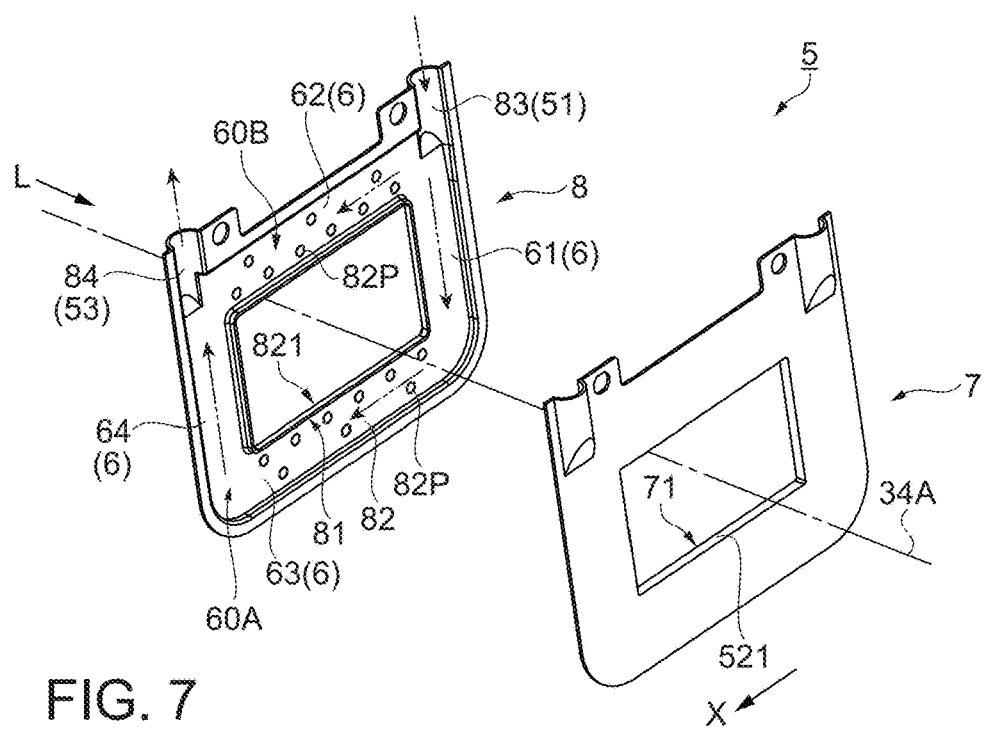
FIG. 7 is an exploded perspective view of the holding section of the first embodiment.

FIG. 5 is an exploded perspective view of the optical device 50 and the tubular members 44 connected to the holding section 5, and is a diagram viewed from the light incident side. FIG. 6 is an exploded perspective view of the holding section 5 viewed from the light incident side. FIG. 7 is an exploded perspective view of the holding section 5 viewed from the light exit side.

The holding section 5 is constituted by a first frame 7 and a second frame 8 each formed of a thermally-conductive material and bonded to each other. The first frame 7 and the second frame 8 of the present embodiment are each formed from a metal sheet made of, for example, aluminum using press working. As shown in FIG. 5 through FIG. 7, the first frame 7 and the second frame 8 are disposed so as to be opposed to each other in a direction along the optical axis 34A. Further, the holding section 5 is disposed on the light incident side of the light modulation device 341 so that the first frame 7 is located on the light modulation device 341 side and the second frame 8 is located on the opposite side of the first frame 7 to the light modulation device 341.

As shown in FIG. 5, the holding section 5 is formed to have a rectangular outer shape viewed from the direction along the optical axis 34A, and has an inflow part 51, a flow channel forming part 52, and an outflow part 53.

The inflow part 51 and the outflow part 53 are disposed on one side in the holding section 5 having the rectangular shape. It should be noted that the description will hereinafter be presented defining the side in the holding section 5, on which the inflow part 51 and the outflow part 53 are disposed, as an "upper side," and the right side of the holding section 5 viewed from the light incident side in the posture, in which the inflow part 51 and the outflow part 53 are on the upper side, as a "right side" (+X side) for the sake of convenience of explanation. Further, the image forming area (the optically effective area) of the light modulation device 341 is formed to have a rectangular shape longer in horizontal direction than in vertical direction.

The inflow part 51 is disposed in the vicinity (the left side (−X side) in the present embodiment) of one end part on the upper side of the holding section 5. The inflow part 51 is formed to have a cylindrical shape, and the tubular member 44 is connected to the inflow part 51. Further, the liquid from the liquid cooling device 4 flows into the inflow part 51.

The flow channel forming part 52 is circularly disposed along the circumferential edge of the light modulation device 341. The inner circumferential edge of the flow channel forming part 52 having the annular shape forms the opening part 521 through which the light L passes. The flow channel forming part 52 is formed so as to surround the optically effective area having a rectangular shape of the liquid crystal panel 340 viewed from the light incident side, and the flow channel 6 through which the liquid from the inflow part 51 circulates is disposed inside the flow channel forming part 52.

The outflow part 53 is disposed in the vicinity (the right side (+X side) in the present embodiment) of the other end part on the upper side of the holding section 5. The outflow part 53 is formed to have a cylindrical shape, and the tubular member 44 is connected to the outflow part 53. Then, the liquid having flowed through the flow channel 6 outflows from the outflow part 53 toward the liquid cooling device 4. As described above, the inflow part 51 and the outflow part 53 are disposed on the same side (the upper side) with respect to the flow channel forming part 52. It should be noted that a part of the duct member (not shown) in the air cooling device 9 is disposed on the opposite side to the inflow part 51 and the outflow part 53 of the holding section 5, namely below the electro-optic device 34.

Here, the shapes of the first frame 7 and the second frame 8 will be described in detail.

As shown in FIG. 6 and FIG. 7, the first frame 7 has a first frame part 72, a first uprise part 71, and recessed parts 73, 74.

The first frame part 72 has an opening part along the inner circumferential edge of the flow channel forming part 52 having an annular shape, and extends in a direction crossing the optical axis 34A.

As shown in FIG. 6 and FIG. 7, the first uprise part 71 rises from the edge part of the opening part in the first frame part 72 toward the second frame 8, and is formed to have a rectangular shape viewed from a direction along the optical axis 34A. The first uprise part 71 forms the inner circumferential edge of the flow channel forming part 52 having an annular shape, namely the edge part of the opening part 521 (see FIG. 5) of the holding section 5.

The recessed part 73 is a region forming a part of the inflow part 51, and is disposed on the upper left side of the first frame part 72, and has a shape having a semicylindrical recess on the second frame 8 side as shown in FIG. 6. The recessed part 74 is a region forming a part of the outflow part 53, and is disposed on the upper right side of the first frame part 72, and has a shape having a semicylindrical recess on the second frame 8 side as shown in FIG. 6.

Further, the first frame part 72 is provided with positioning holes 72h respectively located in the vicinities of the recessed parts 73, 74.

As shown in FIG. 6 and FIG. 7, the second frame 8 has a second frame part 82, a second uprise part 81, recessed parts 83, 84, and an outer circumferential edge part 85.

Figure 8:
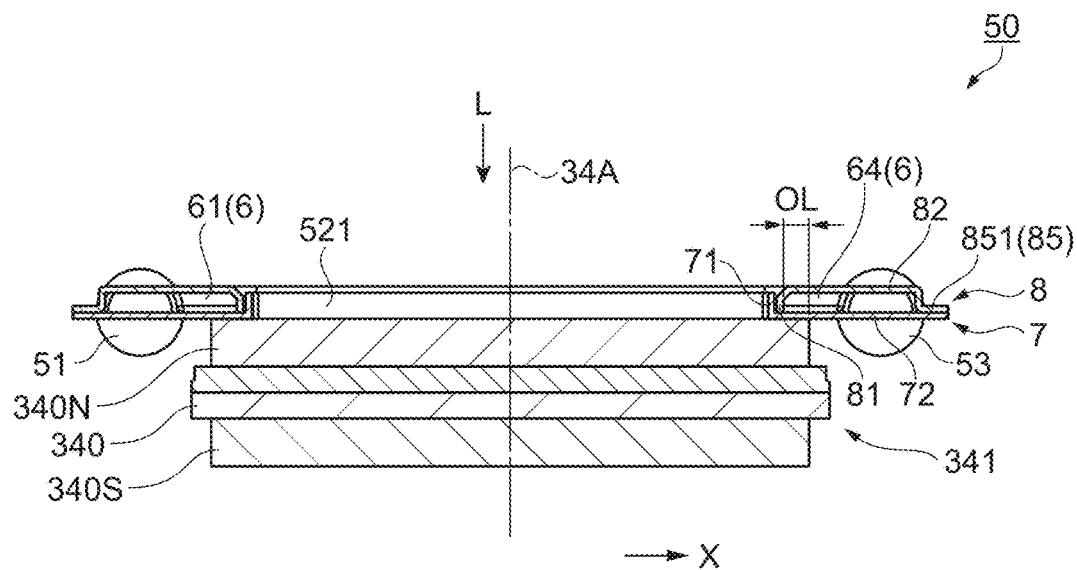
FIG. 8 is a cross-sectional view of the optical device according to the first embodiment.
Figure 9:
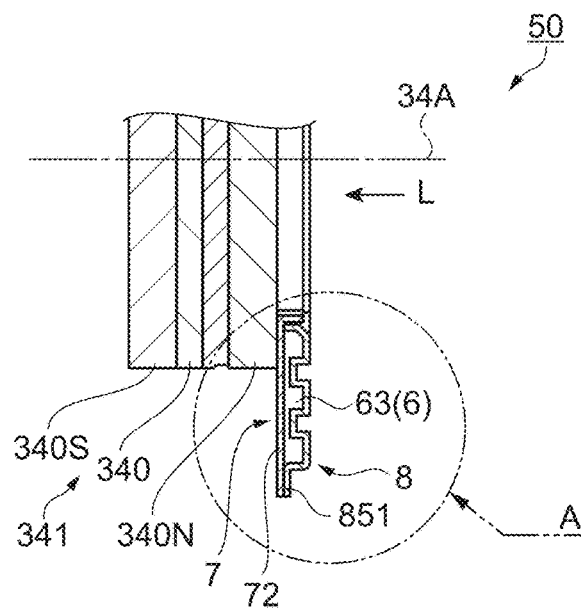
FIG. 9 is a cross-sectional view of the optical device according to the first embodiment, and is a diagram showing the lower side of an optical axis.

FIG. 8 is a cross-sectional view of the optical device 50 viewed from below. FIG. 9 is a cross-sectional view of the optical device 50 viewed from the left (the −X direction) side, and is a diagram showing the lower side of the optical axis 34A.

The second frame part 82 has an insertion opening part 821 to which the first uprise part 71 can be inserted as shown in FIG. 6, and is formed so as to be opposed to the first frame part 72 as shown in FIG. 8. Between the first frame part 72 and the second frame part 82, there is formed the flow channel 6.

Further, as shown in FIG. 7, the second frame part 82 is provided with a plurality of projections 82P projecting toward the first frame 7. The projections 82P project in the flow channel 6 and have a function of generating a turbulent flow due to the liquid colliding with the projections 82P. The projections 82P will be described later in detail.

As shown in FIG. 7, the second uprise part 81 rises from the edge part of the insertion opening part 821 toward the first frame 7, and is formed to have a rectangular shape viewed from a direction along the optical axis 34A. Further, as shown in FIG. 8, the second uprise part 81 is formed so as to be stacked on the outer circumference of the first uprise section 71, namely on the opposite side of the first uprise part 71 to the opening part 521.

The recessed part 83 is disposed at a position opposed to the recessed part 73 of the first frame 7, and has a shape having a semicylindrical recess on the first frame 7 side. Further, the recessed part 83 forms the inflow part 51 together with the recessed part 73.

The recessed part 84 is disposed at a position opposed to the recessed part 74 of the first frame 7, and has a shape having a semicylindrical recess on the first frame 7 side. Further, the recessed part 84 forms the outflow part 53 together with the recessed part 74.

The outer circumferential edge part 85 is a region bent toward the first frame 7 with respect to the second frame part 82, and is formed at the end part on the outer periphery except the upper side of the recessed parts 83, 84 as shown in FIG. 6. Further, as shown in FIG. 8 and FIG. 9, the outer circumferential edge part 85 is provided with an end part 851 formed flatly so as to be stacked on the first frame part 72. The end part 851 is provided with positioning holes 851h corresponding respectively to the two positioning holes 72h of the first frame part 72.

The first frame 7 and the second frame 8 are positioned to each other by a jig inserted into the positioning holes 72h, 851h, and then the first frame part 72 and the end part 851, and the first uprise part 71 and the second uprise part 81 are each connected to each other with, for example, brazing. Further, the first frame 7 and the second frame 8 are connected to each other to thereby form the holding section 5 having the inflow part 51, the flow channel forming part 52, and the outflow part 53. Further, the holding section 5 is sealed except the upper side of the inflow part 51 and the outflow part 53, and the flow channel 6 communicated with the inflow part 51 and the outflow part 53 is disposed in the flow channel forming part 52. As shown in FIG. 8, the flow channel 6 is formed between the first frame part 72 and the second frame part 82, and outside the second uprise part 81 and inside the end part 851 to have an annular shape. As described above, the flow channel 6 is formed of the first frame 7 and the second frame 8 bonded to each other.

Further, the flow channel forming part 52 is formed to have the thickness, namely the size in a direction along the optical axis 34A, smaller than the size (the outer diameter dimension) of the inflow part 51 and the outflow part 53. Further, as shown in FIG. 8, the holding section 5 is disposed so that the first frame part 72 of the first frame 7 is opposed to the light modulation device 341. The dustproof glass member 340N of the light modulation device 341 is fixed to the first frame part 72 via an adhesive.

As shown in FIG. 8, the flow channel 6 is disposed so as to partially overlap the light modulation device 341 viewed from the direction along the optical axis 34A. Specifically, the flow channel 6 is disposed with an overlap OL from the end part of the light modulation device 341.

Here, the flow channel 6 will be described in detail using FIG. 7.

As shown in FIG. 7, the flow channel 6 has a first flow channel part 61, a second flow channel part 62, a third flow channel part 63, and a fourth flow channel part 64 arranged to form an annular shape.

The first flow channel part 61 is disposed on the left (−X direction) side of the opening part 521 and below the inflow part 51, and extends downward. The second flow channel part 62 is disposed above the opening part 521, and extends rightward (in the +X direction) from a position below the inflow part 51. The third flow channel part 63 is disposed below the opening part 521, and extends rightward (in the +X direction) from a position below the first flow channel part 61. The fourth flow channel part 64 is disposed on the right (+X direction) side of the opening part 521, and extends upward from a position on the right (+X direction) side of the third flow channel part 63. Further, the second flow channel part 62 is connected to an upper part of the fourth flow channel part 64. The downward direction corresponds to a first direction, and the rightward direction corresponds to a second direction. Further, the upward direction, which is the opposite direction to the downward direction (the first direction), corresponds to a third direction.

As described above, the flow channel 6 has the first flow channel part 61 and the fourth flow channel part 64 opposed to each other and extending in the first direction, and the second flow channel part 62 and the third flow channel part 63 opposed to each other and extending in the second direction crossing the first direction. Further, the first flow channel part 61, the second flow channel part 62, the third flow channel part 63 and the fourth flow channel part 64 are circularly connected to each other. Further, in the flow channel 6, in accordance with the image forming area (the optically effective area) of the light modulation device 341, the second flow channel part 62 and the third flow channel part 63 are formed longer than the first flow channel part 61 and the fourth flow channel part 64.

As shown in FIG. 7, the projections 82P provided to the second frame 8 described above are disposed in each of the second flow channel part 62 and the third flow channel part 63. The plurality of projections 82P provided to the second flow channel part 62 and the plurality of projections 82P provided to the third flow channel part 63 are formed roughly symmetrically to each other in a vertical direction.

Here, the description will be presented focusing attention on the projections 82P provided to the third flow channel part 63.

Figure 10:
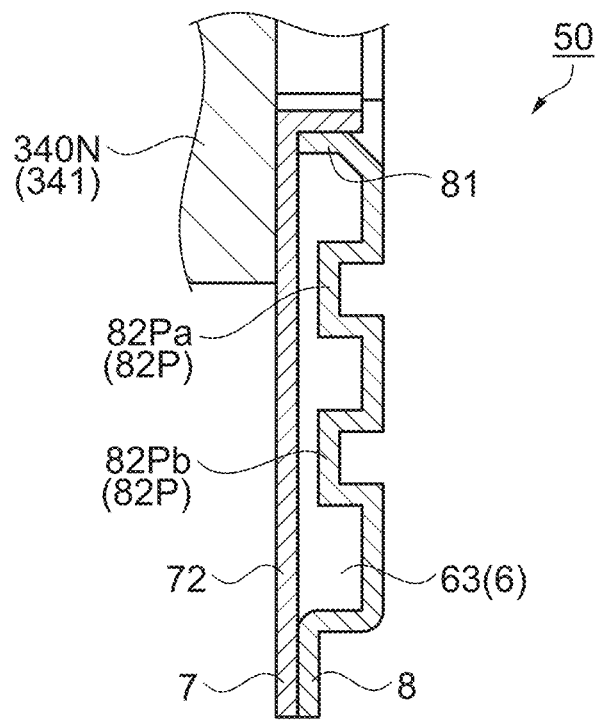
FIG. 10 is an enlarged view of the part A in FIG. 9.
Figure 11:
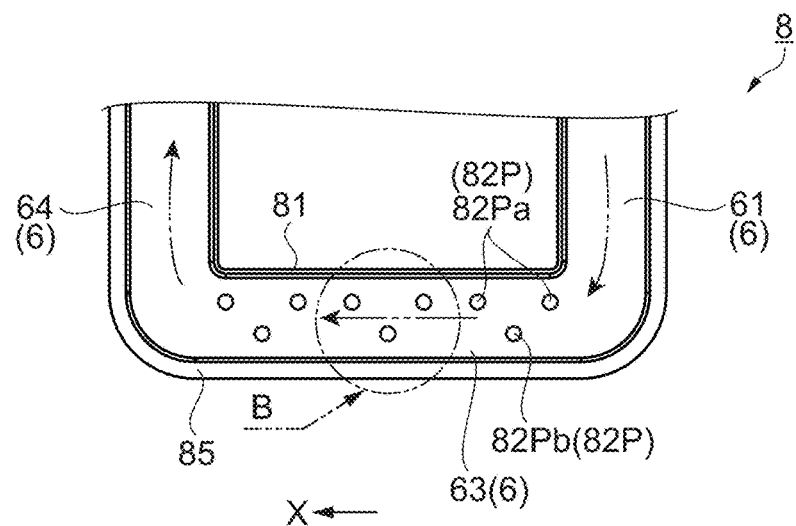
FIG. 11 is a partial plan view of a second frame of the first embodiment.

FIG. 10 is a partial cross-sectional view of the optical device 50, and is an enlarged view of the part A in FIG. 9. FIG. 11 is a partial plan view of the second frame 8, and is a diagram showing the inside of the third flow channel part 63.

The projections 82P are each formed so that the ratio between the size in the X direction (the horizontal direction) and the size in the vertical direction is equal to or lower than 2 (e.g., a columnar shape), and are each formed so as to project toward the first frame part 72 of the first frame 7, and to be separated from the first frame part 72 as illustrated in FIG. 10. Further, since the projections 82P are formed by press working, the second frame 8 is provided with a recessed part formed on the surface on the opposite side to the projections 82P. It should be noted that in FIG. 2, FIG. 5, and FIG. 6, the recessed part is omitted.

As shown in FIG. 11, the plurality of projections 82P includes a plurality of first projections 82Pa disposed near to the second uprise part 81, and a plurality of second projections 82Pb disposed near to the outer circumferential edge part 85 located below the plurality of first projections 82Pa. Further, the second projections 82Pb are each disposed so as to be located between the first projections 82Pa adjacent to each other viewed from below.

Then, the flow of the liquid fed from the liquid cooling device 4 will be described.

As shown in FIG. 7, the liquid fed from the liquid cooling device 4 flows through the flow channel 6 from the inflow part 51, and then outflows to the outside of the holding section 5, namely to the liquid cooling device 4, from the outflow part 53. Specifically, the liquid having flowed therein from the inflow part 51 is partially branched downward by the first flow channel part 61, and the rest separately flows through the second flow channel part 62 in the rightward direction (the +X direction).

Then, the liquid having flowed through the first flow channel part 61 is changed in the direction by the third flow channel part 63 to flow in the rightward direction (the +X direction). The liquid having flowed through the third flow channel part 63 is changed in the direction by the fourth flow channel part 64 to flow upward, and is then combined with the liquid having flowed through the second flow channel part 62. The liquid having flowed through the fourth flow channel part 64 outflows from the outflow part 53 toward the liquid cooling device 4.

Further, since the second flow channel part 62 and the third flow channel part 63 are provided with the projections 82P, the liquid flowing through the second flow channel part 62 and the third flow channel part 63 partially collides with the projections 82P to be changed in direction, but flows in the +X direction (the second direction) as a whole. Here, the direction of the liquid flowing through the flow channel 6 as a whole is defined as a circulation direction. In other words, in the second flow channel part 62 and the third flow channel part 63, the +X direction (the second direction) is the circulation direction.

A part of the liquid flowing through the second flow channel part 62 and the third flow channel part 63 collides with the projections 82P and then flows as a turbulent flow. Specifically, the flow of the liquid in the third flow channel part 63 will be described.

Figure 12:
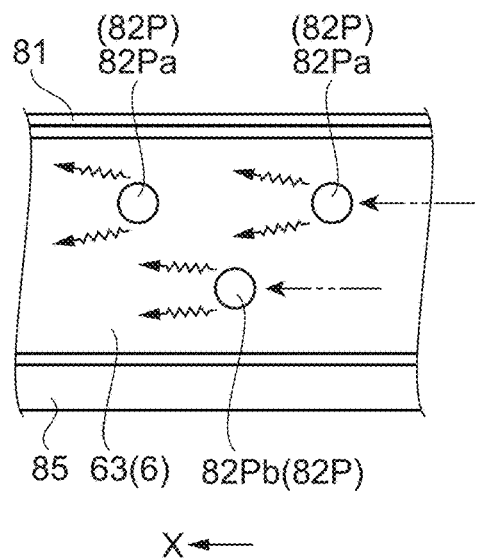
FIG. 12 is an enlarged view of the part B in FIG. 11.

FIG. 12 is a diagram showing a part of the inside of the third flow channel part 63, and is an enlarged view of the part B in FIG. 11.

As described above, and as shown in FIG. 12, the plurality of projections 82P includes the plurality of first projections 82Pa disposed near to the second uprise part 81, and the plurality of second projections 82Pb disposed near to the outer circumferential edge part 85. Further, the second projections 82Pb are each disposed so as to be located between the first projections 82Pa adjacent to each other viewed from below. In other words, each of the second projections 82Pb is disposed on the obliquely downstream side on the opposite side to the second uprise part 81 with respect to the first projection 82Pa located on the upstream side of the second projection 82Pb. Further, on the obliquely downstream side on the second uprise part 81 side of the second projection 82Pb, there is disposed the first projection 82Pa.

As shown in FIG. 12, the part of the liquid having flowed from the first flow channel part 61 to the third flow channel part 63 collides with the first projections 82Pa and the second projections 82Pb to turn to the turbulent flow. The turbulent flow is mainly generated from the upper side and the lower side of each of the first projections 82Pa and the second projections 82Pb toward the downstream side.

A part of the liquid flowing as the turbulent flow from the upper side of the first projection 82Pa flows toward the second uprise part 81. Further, a part of the liquid flowing as the turbulent flow from the lower side of the first projection 82Pa collides with the second projection 82Pb disposed on the obliquely downstream side to flow toward the second uprise part 81.

A part of the liquid flowing as the turbulent flow from the upper side of the second projection 82Pb collides with the first projection 82Pa disposed on the obliquely downstream side of the second projection 82Pb to flow toward the second uprise part 81. Apart of the liquid flowing as the turbulent flow from the lower side of the second projection 82Pb flows toward the outer circumferential edge part 85.

As described above, by disposing the projections 82P, the turbulent flow is generated inside the third flow channel part 63, and at the same time, a lot of turbulent flows flow toward the second uprise part 81 due to the projections 82P arranged as described above. As a result, a thermal boundary layer, which occurs due to a laminar flow in the inner wall (the second uprise part 81) of the third flow channel part 63 is efficiently prevented from occurring, and therefore, the heat exchange is achieved between the second uprise part 81 and the liquid in good condition.

Similarly to the third flow channel part 63, in the second flow channel part 62, the turbulent flow also occurs due to the projections 82P, and the heat exchange is achieved between the second uprise part 81 and the liquid in good condition.

It should be noted that the shape of each of the projections 82P is not limited to the columnar shape providing the ratio between the size in the circulation direction and the size in a direction (a crossing direction) crossing the circulation direction is equal to or lower than 2, and it is also possible to adopt, for example, an elliptical planar shape or a polygonal planar shape.

As described above, the liquid having flowed therein from the inflow part 51 flows through a first path 60A in which the liquid flows along the first flow channel part 61, the third flow channel part 63, and the fourth flow channel part 64, and a second path 60B in which the liquid flows along the second flow channel part 62 and is then combined with the liquid having flowed through the fourth flow channel part 64, and then outflows from the outflow part 53 toward the liquid cooling device 4.

The light modulation device 341 is cooled by the liquid circulating through the flow channel 6. Specifically, the heat of the light modulation device 341 generating the heat due to the incident light is transferred to the liquid via the first frame 7. Further, since the flow channel 6 is formed along the circumferential edge of the light modulation device 341 so as to form an annular shape, the heat of the light modulation device 341 is transferred to the liquid from the area surrounding the optically effective area (an image forming area) of the light modulation device 341. Further, the second uprise part 81 is disposed in the vicinity of the optically effective area, and the heat exchange between the second uprise part 81 in the second flow channel part 62 and the third flow channel part 63 and the liquid is achieved in good condition due to the turbulent flow by the projections 82P as described above. Therefore, in the light modulation device 341, the area near to the center the highest in temperature is efficiently cooled.

Then, the liquid having flowed out from the holding sections 5R, 5G, and 5B disposed in series inflows into the heat exchange device 43 along the circulation channel 4F. The liquid having flowed into the heat exchange device 43 is cooled by the heat exchange device 43 absorbing the heat of the liquid. Then, the liquid having been cooled by the heat exchange device 43 inflows again into the holding section 5 (the holding section 5R in the present embodiment) to cool the light modulation device 341. As described above, the heat having been absorbed by the heat exchange device 43 is radiated from the heat radiation section 433 of the heat exchange device 43. Then, the heat radiated from the heat radiation section 433 is discharged to the outside of the projector 1 through the exhaust port of the exterior housing 2 by the exhaust device not shown.

Further, since the holding section 5 is disposed on the light incident side of the light modulation device 341, the holding section 5 is also irradiated with a part (e.g., leakage light propagating toward the outside of the optically effective area of the light modulation device 341) of the light propagating toward the optical device 50. However, since the flow channel 6 is disposed having the overlap OL (see FIG. 8) from the end part of the light modulation device 341, the heat of the holding section 5 generated due to the light with which the holding section 5 is irradiated becomes hard to be transferred to the light modulation device 341. Specifically, since the liquid intervenes between the irradiated part (mainly the second frame part 82 of the second frame 8) of the holding section 5 irradiated with the light and the light modulation device 341, the heat of the irradiated part generated by the light with which the irradiated part is irradiated becomes hard to be transferred to the light modulation device 341.

As described above, the light modulation device 341 is held by the holding section 5 provided with the flow channel 6 having an annular shape, and is cooled by the liquid supplied to the flow channel 6.

As described hereinabove, according to the optical device 50 and the projector 1 according to the present embodiment, the following advantages can be obtained.

1. The holding sections 5 for holding the light modulation devices 341 are provided with the flow channel 6 having an annular shape, and it becomes possible to transfer the heat of the light modulation devices 341 from the areas surrounding the optically effective areas of the light modulation devices 341 to the liquid.

Further, since the members intervening between the light modulation device 341 and the liquid are reduced compared to the configuration of circulating the liquid using different members (pipe-like members) from the holding section 5, the heat of the light modulation device 341 is efficiently transferred to the liquid.

Therefore, it becomes possible to efficiently cool the light modulation device 341, and rise in temperature of the light modulation device 341 can efficiently be suppressed. Therefore, the deterioration of the light modulation devices 341 is suppressed, and it becomes possible to provide the optical device 50 capable of surely exerting the optical characteristics provided to the light modulation devices 341.

Further, since the optical device 50 can be formed of a smaller number of components compared to the configuration of circulating the liquid using different members from the holding sections 5, it becomes possible to provide the optical device 50 making it possible to reduce the manufacturing man-hour and the component cost and to reduce the device size.

2. The flow channel 6 has the first flow channel part 61 through the fourth flow channel part 64, and is formed to have an annular shape. Thus, with respect to the light modulation device 341 having the optically effective area (the image forming area) having a rectangular shape, it becomes possible to dispose the flow channel 6 closely to the optically effective area. Therefore, since it becomes possible to more efficiently transfer the heat of the light modulation device 341 to the liquid, it becomes possible to provide the optical device 50 capable of more strongly suppressing the rise in temperature of the light modulation device 341.

3. The projections 82P are formed in the flow channel 6, and the turbulent flow is generated. Thus, it is possible to achieve the heat exchange between the inner wall (the second uprise part 81) of the flow channel 6 and the liquid in good condition, and therefore, it becomes possible to more efficiently prevent the rise in temperature of the light modulation device 341.

4. The projections 82P are disposed in the second flow channel part 62 and the third flow channel part 63 extending in the longitudinal direction in the flow channel 6 having the rectangular planar shape. Thus, it becomes possible to suppress the occurrence of the thermal boundary layer in the second flow channel part 62 and the third flow channel part 63 which is apt to occur in a broader range than in the first flow channel part 61 and the fourth flow channel part 64 in the laminar flow. Therefore, it becomes possible to provide the optical device 50, which is provided with the light modulation device 341 having the optically effective area having an oblong shape, and in which the rise in temperature of the light modulation device 341 is efficiently suppressed.

5. In the holding section 5, the first frame 7 and the second frame 8 provided with the projections 82P are bonded to each other to form the flow channel 6. Thus, even in the configuration of having the flow channel 6 through which the liquid circulates, it is possible to form the holding section 5 provided with the projections 82P with easy working, and while suppressing the increase in manufacturing man-hour.

6. The inner circumferential edge side of the flow channel forming part 52 having the annular shape is formed by connecting the second uprise part 81 having a plate-like shape to the first uprise part 71 having a plate-like shape. Further, the flow channel 6 is disposed on the outer side of the second uprise part 81. Thus, it becomes possible to form the flow channel 6 closely to the optically effective area of the light modulation device 341. Therefore, it becomes possible to provide the optical device 50 in which the light modulation device 341 is effectively cooled while easily forming the flow channel 6 even in the configuration of forming the holding section 5 with the two members (the first frame 7, the second frame 8).

7. Since in the holding section 5, the inflow part 51 and the outflow part 53 are disposed on the same side with respect to the flow channel forming part 52, the tubular members 44 to be connected to the inflow part 51 and the outflow part 53 can compactly be disposed. Therefore, it becomes possible to provide the optical device 50 capable of making a contribution to the miniaturization of the projector 1.

8. The light modulation device 341 as the optical element is efficiently cooled by the liquid having flowed into the holding section 5, and is therefore prevented from rising in temperature. Therefore, it becomes possible to provide the optical device 50 provided with the light modulation device 341 exerting the own optical characteristics to modulate the incident light for a long period of time.

9. Since the projector 1 is provided with the optical devices 50 and the liquid cooling device 4, even in the configuration provided with the light source 311 for emitting high-intensity light, the light modulation devices 341 are efficiently cooled, and projection of bright images and images good in quality becomes possible for a long period of time.

Further, since the degree of freedom of the shape of the flow channel 6 can be increased compared to the configuration of circulating the liquid using different members from the holding section 5, it becomes possible to circulate the liquid with low pressure. Thus, it becomes possible to achieve miniaturization and reduction in power of the liquid pressure-feeding section 41 for circulating the liquid.

Further, since it is possible to circulate the liquid with low pressure, it becomes possible to prevent the volatilization and the leakage of the liquid from the connection section between the members in the circulation channel 4F. Thus, it is possible to prevent the liquid from adhering to other members in the projector 1, and at the same time it becomes possible to adopt a configuration provided with a small amount of liquid. Therefore, it becomes possible to provide the projector 1 provided with the liquid cooling device 4 small in size and low in power consumption.

It should be noted that the invention is not limited to the first embodiment described above, but a variety of modifications or improvements can be provided to the first embodiment described above. Some modified examples of the first embodiment will hereinafter be described.

Modified Example 1

Although in the first embodiment the projections 82P are disposed in the flow channel 6, it is also possible to adopt a configuration in which the projections are disposed inside the inflow part 51. Further, it is also possible to adopt a configuration of using the projections to achieve alignment between the two members constituting the holding member 5.

Figure 13:
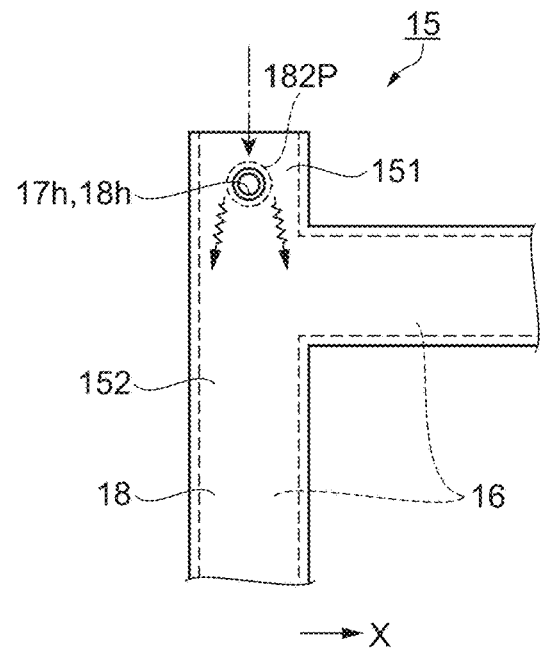
FIG. 13 is a plan view showing a part of a holding section of Modified Example 1 of the first embodiment.
Figure 14:
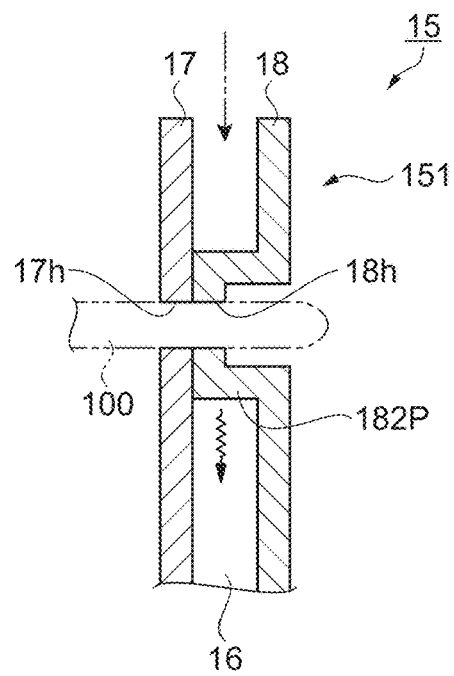
FIG. 14 is a cross-sectional view showing a part of the holding section of Modified Example 1 of the first embodiment.

FIG. 13 and FIG. 14 are schematic views for explaining the configuration of a holding section 15 of Modified Example 1 of the first embodiment. Specifically, FIG. 13 is a plan view showing a part of the holding section 15, and FIG. 14 is a cross-sectional view showing a part of the holding section 15.

As shown in FIG. 13 and FIG. 14, the holding section 15 is provided with a first frame 17 and a second frame 18 each formed of a thermally-conductive material, and is formed of the first frame 17 and the second frame 18 bonded to each other. Similarly to the holding section 5 of the first embodiment, the holding section 15 has an inflow part 151, a flow channel forming part 152 having a flow channel 16 inside, and an outflow part (not shown). Further, inside the inflow part 151, there is disposed a projection 182P.

As shown in FIG. 14, the projection 182P projects from the second frame 18 so as to have a columnar shape, and is connected to the first frame 17 so that the heat conduction can be achieved. Further, the center of the projection 182P and the first frame 17 are each provided with an insertion hole (the insertion hole of the first frame 17 is denoted by 17h, the insertion hole of the second frame 18 is denoted by 18h) through which a member 100 having a pin-like shape is inserted.

The first frame 17 and the second frame 18 are aligned with each other by the member 100 inserted to the insertion holes 17h, 18h, and the tip of the projection 182P is connected to the first frame 17 with brazing or the like in addition to the parts shown in the first embodiment. The projection 182P projecting from the second frame 18 corresponds to a heat transferring projection having contact with the first frame 17 so that the heat conduction can be achieved.

A part of the liquid having flowed in the inflow part 151 collides with the projection 182P to flow through the flow channel 16 as a turbulent flow, and then cools the light modulation device 341. Further, the heat having been transferred from the light modulation device 341 to the first frame 17 is transferred to the second frame 18 via the brazed parts including the projection 182P.

As described above, the projection 182P is disposed inside the inflow part 151, and has a function of generating the turbulent flow, and at the same time aligning the first frame 17 and the second frame 18 with each other, and improving the radiation performance of the holding section 15.

Further, it is also possible to configure the holding section provided with the projections disposed in the flow channel and inside the inflow part.

Modified Example 2

It is also possible to configure the projection with a different member from the first frame 17 or the second frame 18 instead of the projection 182P in the Modified Example 1.

Figure 15:
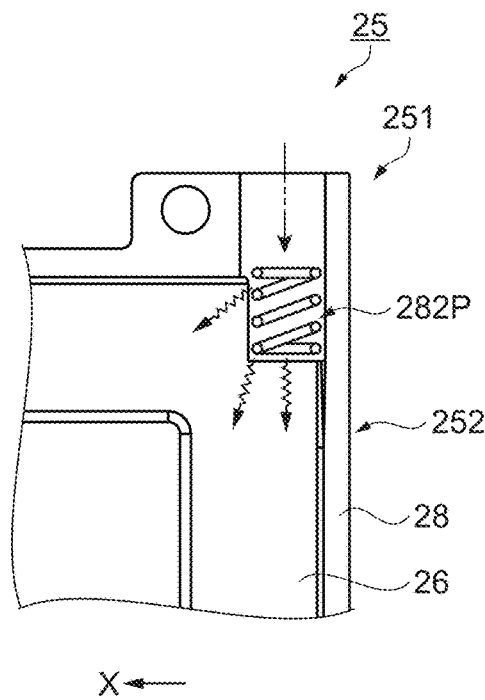
FIG. 15 is a plan view showing a part of a holding section of Modified Example 2 of the first embodiment.

FIG. 15 is a schematic diagram for explaining the configuration of a holding section 25 of Modified Example 2 of the first embodiment, and is a plan view showing a part of the holding section 25.

As shown in FIG. 15, the holding section 25 is provided with a first frame (not shown) and a second frame 28, and is formed of the first frame and the second frame 28 bonded to each other. Similarly to the holding section 5 of the embodiment described above, the holding section 25 has an inflow part 251, a flow channel forming part 252 having a flow channel 26 inside, and an outflow part (not shown). Further, inside the inflow part 251, there is disposed a projection 282P.

The projection 282P is formed of, for example, a coil spring, and is disposed so that the central axis extends along the direction in which the liquid flows in the inflow part 251.

A part of the liquid having flowed in the inflow part 251 collides with the projection 282P to flow through the flow channel 26 as a turbulent flow, and then cools the light modulation device 341.

Modified Example 3

The projection 82P of the first embodiment is separated from the first frame 7 (see FIG. 10), but it is possible to adopt a configuration provided with a projection having contact with the first frame 7 so that the heat conduction can be achieved.

Figure 16:
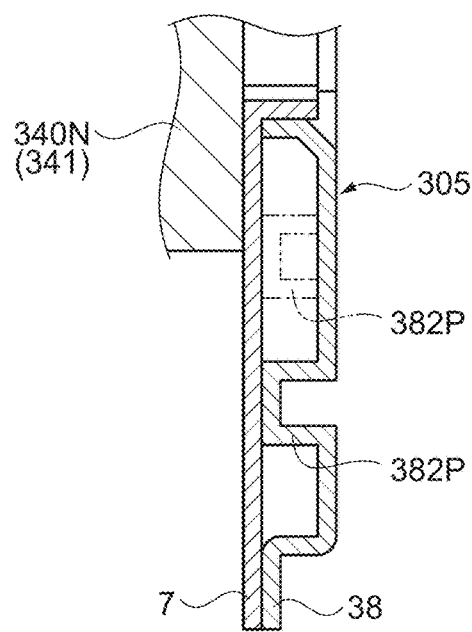
FIG. 16 is a partial cross-sectional view of a holding section of Modified Example 3 of the first embodiment and a light modulation device held by the holding section.

FIG. 16 is a schematic diagram for explaining the configuration of a holding section 305 of Modified Example 3 of the first embodiment, and is a partial cross-sectional view of a holding section 305 and the light modulation device 341 held by the holding section 305.

As shown in FIG. 16, the holding section 305 is formed of the first frame 7 of the first embodiment, and a second frame 38, which is different from the second frame 8 of the first embodiment, bonded to each other. Further, the second frame 38 is provided with projections 382P having contact with the first frame so that the heat conduction can be achieved. The projections 382P correspond to the heat transferring projections having contact with the first frame 7 so that the heat conduction can be achieved.

According to this configuration, since the thermal conductivity from the first frame 7 to the second frame 38 is improved by the projections 382P, it becomes possible to improve the radiation performance of the holding section 305.

Further, in the configuration in which the holding section 305 is disposed on the light incident side of the light modulation device 341, it is desirable for the liquid to intervene between the irradiated part (the second frame 38) irradiated with the light of the holding section 305 and the light modulation device 341. Therefore, it is desirable to dispose the projections 382P at positions not overlapping the light modulation device 341 viewed from the direction along the optical axis 34A. In other words, it is desirable to adopt a configuration not provided with the projection 382P indicated by the dashed-two dotted line shown in FIG. 16.

Modified Example 4

The projections 82P are disposed in the second flow channel part 62 and the third flow channel part 63 in the first embodiment, but can also be disposed in either one of the second flow channel part 62 and the third flow channel part 63.

Further, it is also possible to dispose the projections 82P in the first flow channel part 61 and the fourth flow channel part 64, or corner parts (e.g., between the first flow channel part 61 and the third flow channel part 63, and between the third flow channel part 63 and the fourth flow channel part 64) of the flow channel 6.

Modified Example 5

The projections 82P are each formed so that the ratio between the size in the circulation direction and the size in a direction (a crossing direction) crossing the circulation direction is equal to or lower than 2 in the first embodiment, but can also be provided with a shape of extending in the circulation direction so that the ratio of the size in the circulation direction to the size in the crossing direction exceeds 2. For example, it is also possible to form a shape corresponding to a fin in a heatsink or the like as a projection. In the case of this configuration, since the surface area of the holding section in the flow channel can be made larger, it becomes possible to improve the radiation performance of the holding section.

Further, it is also possible to adopt a configuration provided with both of the projections having the ratio between the size in the circulation direction and the size in the crossing direction equal to or lower than 2, and the projections having the size with the ratio of the size in the circulation direction to the size in the crossing direction exceeding 2.

Modified Example 6

The projections 82P are provided to the second frame 8 in the first embodiment, but it is also possible to adopt a configuration in which the projections 82P are provided to the first frame 7. Similarly, it is also possible to adopt a configuration in which the projections 182P, 382P of Modified Example 1 and Modified Example 3 of the first embodiment are provided to the first frame 17, 7, respectively.

Modified Example 7

Although in the holding section 5 of the first embodiment, the inflow part 51 and the outflow part 53 are disposed on the same side with respect to the flow channel forming part 52, the positions of the inflow part 51 and the outflow part 53 are not limited to such positions. For example, it is also possible to adopt a configuration in which the outflow part 53 is disposed at the diagonal position of the inflow part 51 with respect to the flow channel forming part 52.

Modified Example 8

The first frame 7 and the second frame 8 are formed from a metal sheet using press working in the first embodiment, but can also be formed using a molding processing for molding melted metal with a metal mold. If the molding processing is used, it is possible to configure the holding section 5 without providing the recessed part (see FIG. 10) to the opposite side surface of the projection 82P. Similarly, the two members constituting the holding sections 15, 25, 305 of Modified Examples 1 through 3 can be those formed from a metal sheet using press working, or can also be those formed using molding processing.

Modified Example 9

Although the liquid cooling device 4 of the first embodiment is provided with the tank 42, it is also possible to adopt a configuration not provided with the tank 42.

Modified Example 10

Although the light source device 31 of the first embodiment is configured including the light source 311 of a discharge type, light source is not limited to the discharge type, and it is also possible to adopt a configuration provided with a lamp of other types, a solid-state light source such as a light emitting diode or a laser, or the like.

Further, although the optical unit 3 of the first embodiment is configured so that the direction in which the light source device 31 emits the light, and the direction in which the projection optical device 35 performs the projection are the same as each other as shown in FIG. 1, it is also possible to configure the optical unit so that the direction in which the light source device 31 emits the light, and the direction in which the projection optical device 35 performs the projection are different from each other.

Modified Example 11

Although the projector 1 according to the first embodiment adopts a so-called three-panel system provided with the three light modulation devices 341R, 341G, and 341B corresponding respectively to the R light, the G light, and the B light, the invention is not limited thereto, but a single-panel system can also be adopted, or there can also be adopted a configuration provided with two or four or more light modulation devices 341.

Further, although the light modulation device 341 of the embodiment described above is configured including the liquid crystal panel 340 of the transmissive type, it is also possible to adopt a configuration in which the light modulation device is formed of a reflective liquid crystal panel. Further, those using a micromirror light modulation device such as a digital micromirror device (DMD) as the light modulation device can also be adopted.

Second Embodiment

An optical device 150 according to a second embodiment of the invention will hereinafter be described with reference to the accompanying drawings. In the following description, similar constituents to those of the first embodiment are denoted by the same reference symbols, and the detailed description thereof will be omitted or simplified.

The optical device 150 according to the present embodiment is provided with a holding section 5X different from the holding section 5 in the optical device 50 of the first embodiment.

Figure 17:
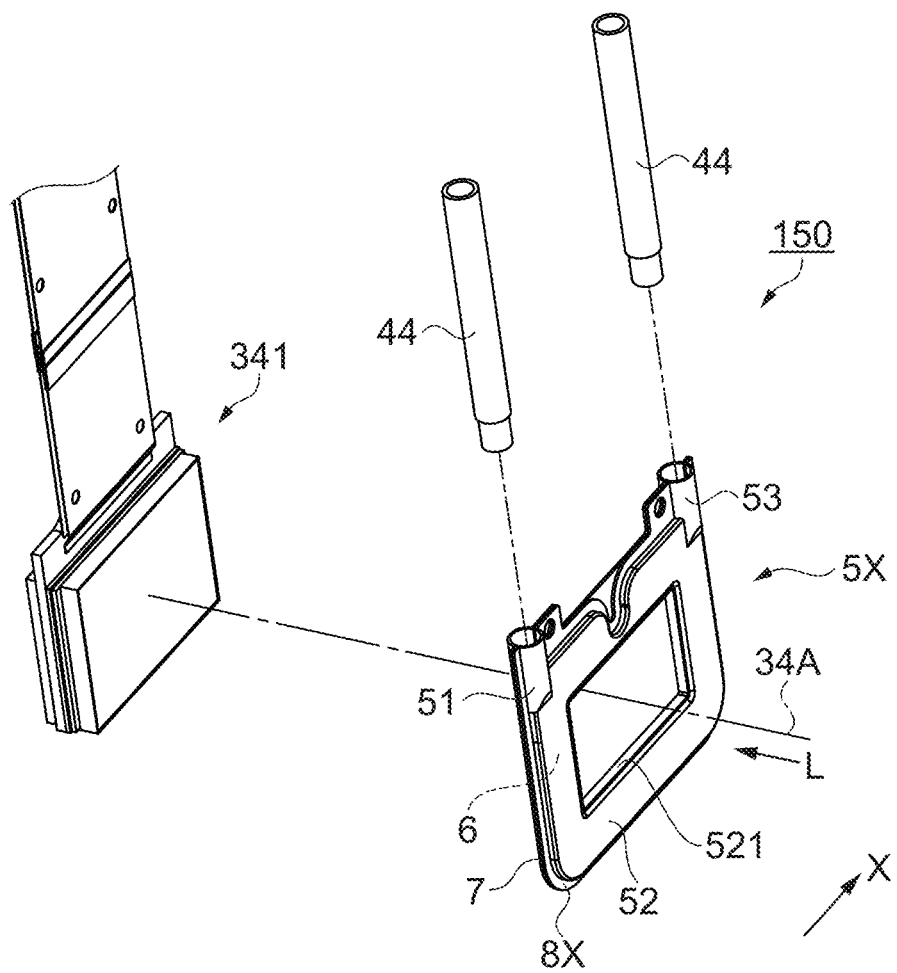
FIG. 17 is an exploded perspective view of an optical device according to a second embodiment of the invention, and the tubular members connected to a holding section.
Figure 18:
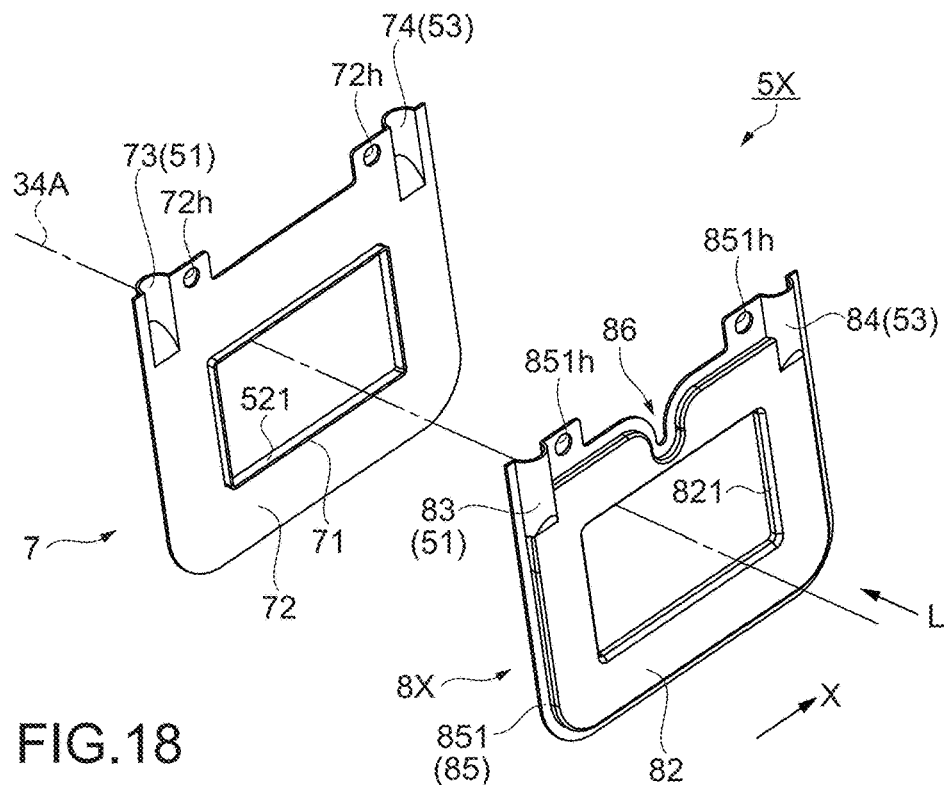
FIG. 18 is an exploded perspective view of the holding section of the second embodiment.
Figure 19:
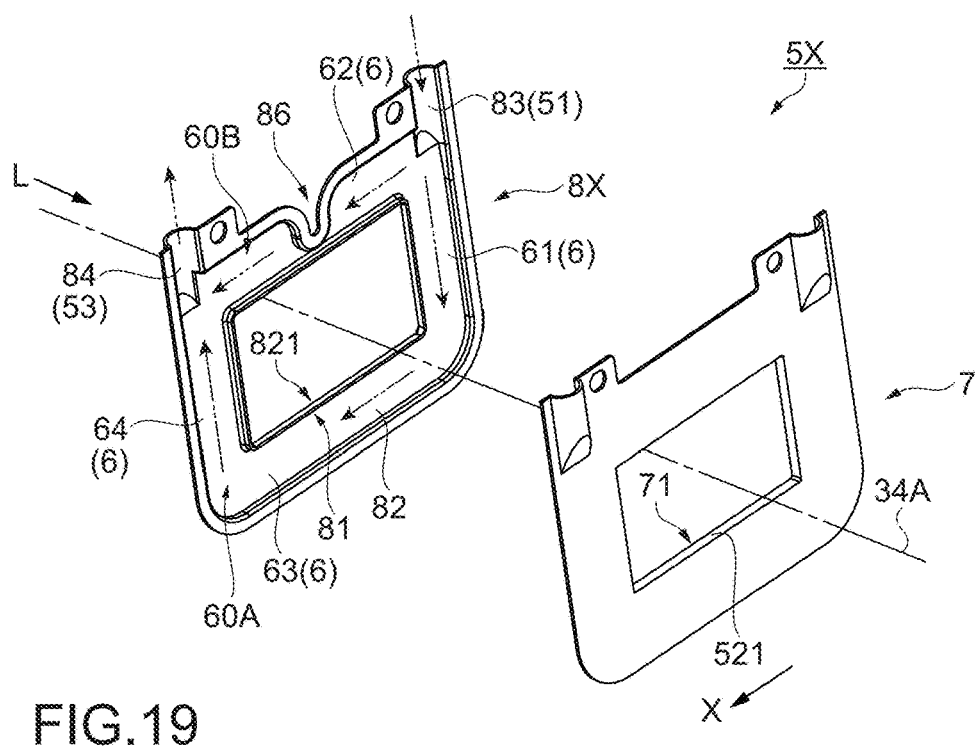
FIG. 19 is an exploded perspective view of the holding section of the second embodiment.

FIG. 17 is an exploded perspective view of the optical device 150 and the tubular members 44 connected to the holding section 5X, and is a diagram viewed from the light incident side. FIG. 18 is an exploded perspective view of the holding section 5X viewed from the light incident side. FIG. 19 is an exploded perspective view of the holding section 5X viewed from the light exit side.

As shown in FIG. 17 through FIG. 19, the holding section 5X is formed of the first frame 7, and a second frame 8X, which is different from the second frame 8 (see FIG. 7) of the first embodiment, bonded to each other.

The second frame 8X is not provided with the projections 82P provided to the second frame 8, and is provided with a narrowed part 86 not provided to the second frame 8.

Figure 20:
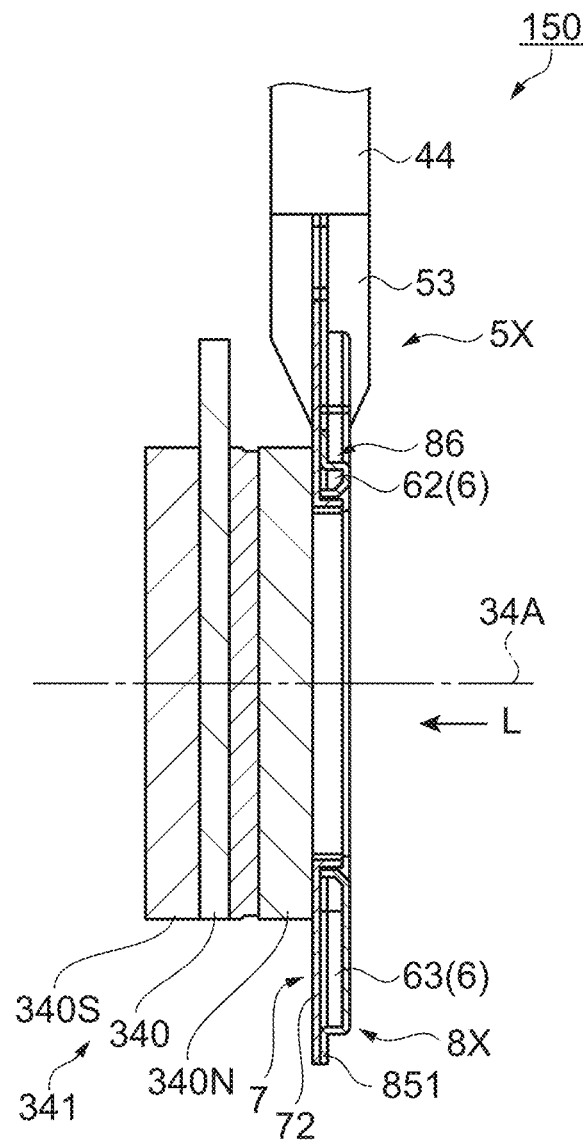
FIG. 20 is a cross-sectional view of the optical device according to the second embodiment.

FIG. 20 is a cross-sectional view of the optical device 150 viewed from the left (the −X direction) side.

As shown in FIG. 19 and FIG. 20, the narrowed part 86 is disposed on the upper side (the second flow channel part 62) of the second uprise part 81, and is formed so that the distance between the second uprise part 81 and the outer circumferential edge part 85 on the upper side is partially narrowed in the vertical direction, namely so that the outer circumferential edge part 85 on the upper side partially comes closer to the second uprise part 81.

Since the second flow channel part 62 is provided with the narrowed part 86, the liquid flowing through the second flow channel part 62 (the second path 60B) becomes low in flow rate compared to the configuration not provided with the narrowed part 86. Thus, in the temperature distribution of the surface of the light modulation device 341, the region the highest in temperature comes closer to the center of the surface compared to the configuration not provided with the narrowed part 86.

That is, since the first path 60A is formed to be longer than the second path 60B, the liquid flowing through the first path 60A gradually rises in temperature as proceeding along the first flow channel part 61, the third flow channel part 63, and the fourth flow channel part 64. Therefore, the temperature of the liquid flowing through the fourth flow channel part 64 becomes higher than the temperature of the liquid flowing through the first flow channel 61 or the second flow channel 62. However, since the narrowed part 86 is provided, the flow rate of the liquid flowing through the second flow channel part 62 is lowered. Therefore, the heat of the light modulation device 341 is transferred in larger amounts, and thus, the temperature difference between the temperature of the liquid flowing through the fourth flow channel 64 and the temperature of the liquid flowing through the second flow channel 62 decreases. Thus, the temperature distribution of the surface of the light modulation device 341 becomes balanced one in which the region the highest in temperature comes closer to the center of the surface.

As described above, the holding section 5X has the flow channel forming part 52 having the flow channel 6 having an annular shape, and the inflow part 51 and the outflow part 53 disposed on the same side with respect to the flow channel forming part 52. Further, the second path 60B shorter than the first path 60A is provided with the narrowed part 86. Further, the light modulation device 341 is held by the holding section 5X, and is cooled by the liquid supplied to the flow channel 6.

As described hereinabove, according to the optical device 150 related to the present embodiment, the following advantages can be obtained in addition to the advantages 1, 2, and 5 through 9 in the first embodiment.

1. Since in the holding section 5X, the inflow part 51 and the outflow part 53 are disposed on the same side with respect to the flow channel forming part 52, it becomes possible to efficiently dispose the members below the holding section 5X. In the present embodiment, a part of the duct member (not shown) in the air cooling device 9 is disposed below the holding section 5X, namely below the electro-optic device 34. Thus, it becomes possible to provide the projector 1 provided with the liquid cooling device 4 and the air cooling device 9 while suppressing the growth in size, and capable of efficiently cooling the cooling target.

2. The flow channel 6 of the holding section 5X is provided with the narrowed part 86, and the light modulation device 341 becomes to have the balanced temperature distribution in which the region close to the center of the surface is the highest in temperature. Thus, even if there occurs the case in which there occurs the temperature distribution causing the color variation and so on in the image to be projected, it becomes possible for the projector 1 to simplify the image processing for correcting the color variation and so on.

Some modified examples of the second embodiment will hereinafter be described.

The narrowed part 86 is formed so as to be partially narrowed in the vertical direction in the second embodiment, but can also be formed so as to be partially narrowed in a bonding direction in which the two members (the first frame and the second frame) are bonded to each other. In the case of this configuration, since it becomes possible to perform an adjustment in the direction of increasing the narrowing amount in the state in which the two members are bonded to each other, it becomes possible to form the holding section capable of coping with, for example, a plurality of models of the projector 1. Specifically, the two members are bonded to each other in advance with the small narrowing amount, or in the state without the narrowing amount, then the narrowing amount is adjusted in accordance with, for example, the light source device different in luminance of the light to be emitted to make it possible to efficiently cool the optical element.

Third Embodiment

An optical device 250 according to a third embodiment of the invention will hereinafter be described with reference to the accompanying drawings. In the following description, similar constituents to those of the second embodiment are denoted by the same reference symbols, and the detailed description thereof will be omitted or simplified.

The optical device 250 according to the present embodiment is provided with a holding section 5Y different from the holding section 5X in the optical device 150 of the second embodiment.

Figures 21, 22:
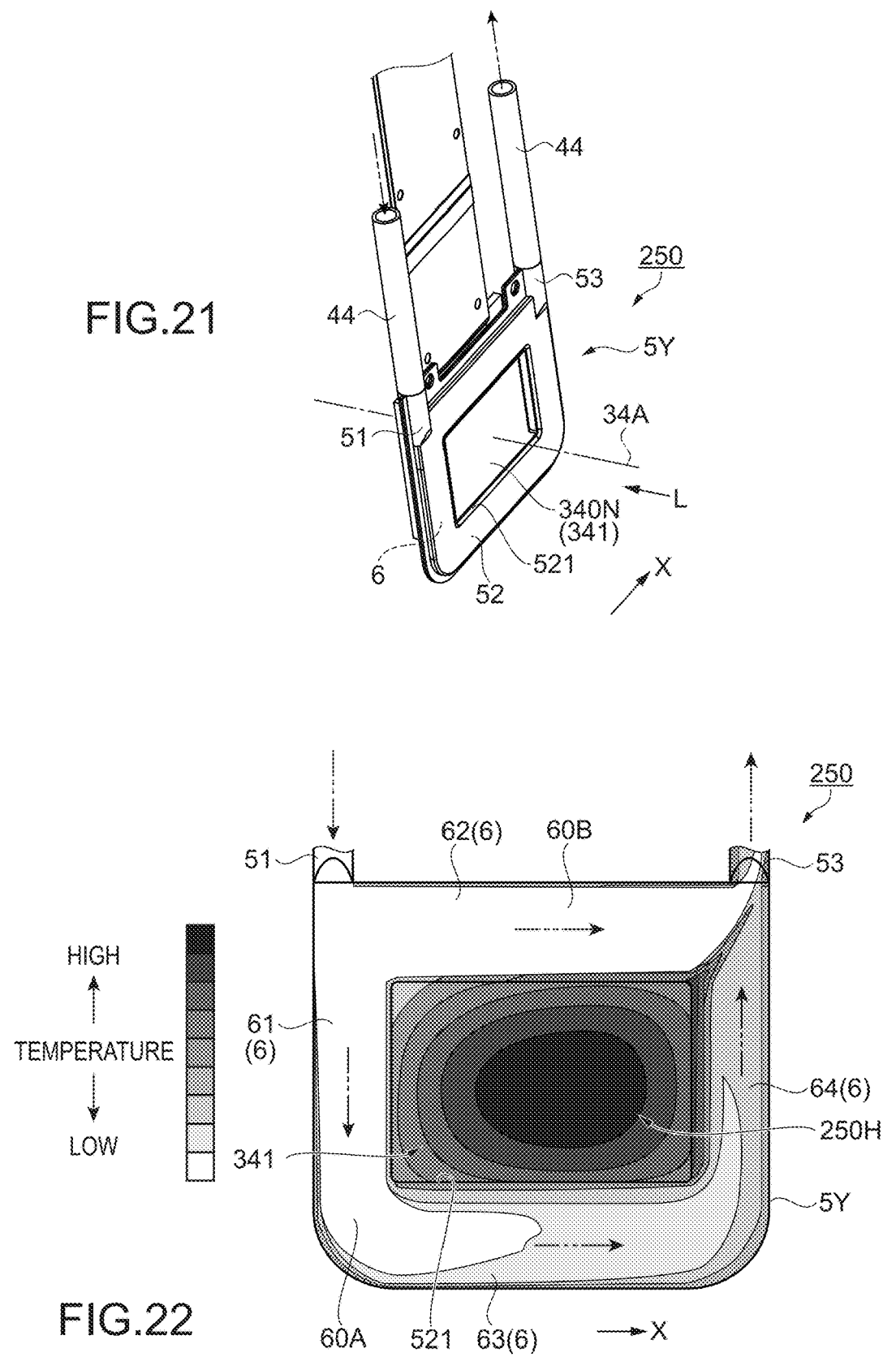

FIG. 21 is a perspective view of the optical device 250 and the tubular members 44 connected to the holding section 5Y viewed from the light incident side.

As shown in FIG. 21, the holding section 5Y has the flow channel forming part 52 having the flow channel 6 having an annular shape, and the inflow part 51 and the outflow part 53 disposed on the same side with respect to the flow channel forming part 52, and has a shape not provided with the narrowed part 86 (see FIG. 18) provided to the holding section 5X of the second embodiment. Further, the cross-sectional shape of the flow channel 6 is roughly equivalently formed throughout the first flow channel part 61 through the fourth flow channel part 64.

FIG. 22 is a diagram showing a simulation result of the temperature of the liquid in the holding section 5Y in the optical device 250, and the surface temperature of the light modulation device 341. It should be noted that FIG. 22 is a diagram of the optical device 250 viewed from the light incident side.

As shown in FIG. 22, the liquid having flowed therein from the inflow part 51 outflows from the outflow part 53 toward the liquid cooling device 4 via the first path 60A (the first flow channel part 61, the third flow channel part 63, and the fourth flow channel part 64), and the second path 60B (the second flow channel part 62).

In the light modulation device 341, the optically effective area is surrounded by the flow channel 6 viewed from the light incident side, and is cooled to the temperature obviously higher than the temperature of the liquid. Further, in the light modulation device 341, the further from the flow channel 6 the region is, the higher the temperature of the region rises, but the light modulation device 341 is cooled to the temperature equal to or lower than the temperature at which the quality is sufficiently maintained.

As described hereinabove, according to the optical device 250 related to the present embodiment, the following advantage can be obtained in addition to the advantages 1, 2, and 5 through 9 in the first embodiment.

Since the cross-sectional shape of the flow channel 6 is roughly equivalently formed throughout the first flow channel part 61 through the fourth flow channel part 64, it becomes possible to circulate the liquid through the flow channel 6 with lower pressure. Therefore, it becomes possible to further prevent the volatilization and the leakage of the liquid, and to simply configure the connection between the holding section 5Y and the tubular members 44.

Fourth Embodiment

An optical device 350 according to a fourth embodiment of the invention will hereinafter be described with reference to the accompanying drawings. In the following description, similar constituents to those of the second embodiment are denoted by the same reference symbols, and the detailed description thereof will be omitted or simplified. The optical device 350 according to the present embodiment is provided with a holding section 5Z different from the holding section 5X in the optical device 150 of the second embodiment.

Figure 23:
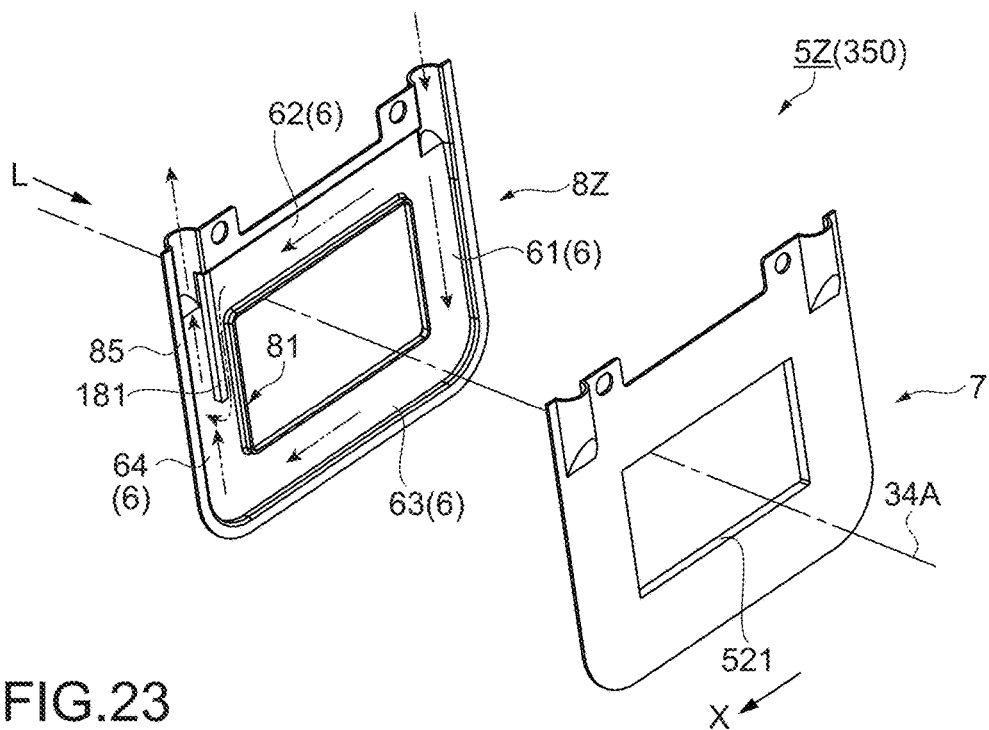
FIG. 23 is an exploded perspective view of a holding section of a fourth embodiment of the invention.

FIG. 23 is an exploded perspective view of the holding section 5Z of the present embodiment, and is a diagram viewed from the light incident side.

As shown in FIG. 23, the holding section 5Z is provided with the first frame 7, and a second frame 8Z different in shape from the second frame 8X in the holding section 5X, and is formed of the first frame 7 and the second frame 8Z bonded to each other. Inside the holding section 5Z, there is disposed the flow channel 6 having an annular shape similarly to the holding section 5X.

The second frame 8Z is not provided with the narrowed part 86 (see FIG. 19) provided to the second frame 8X of the second embodiment, and has a projecting wall 181 disposed in the flow channel 6. In other words, the holding section 5Z of the present embodiment has a shape obtained by providing the holding section 5Y (see FIG. 21) of the third embodiment with the projecting wall 181. The projecting wall 181 corresponds to a detour part.

As shown in FIG. 23, the projecting wall 181 is disposed between the second uprise part 81 and the right side (the +X side) of the outer circumferential edge part 85 in the fourth flow channel part 64. Further, the projecting wall 181 extends from roughly the center in the vertical direction of the second uprise part 81 to the upper side of the outer circumferential edge part 85.

The liquid having flowed through the second flow channel part 62 is changed in the direction by the projecting wall 181, and flows downward between the projecting wall 181 and the second uprise part 81. The liquid having flowed downward between the projecting wall 181 and the second uprise part 81 is changed in the direction by the liquid having flowed through the third flow channel part 63 at the end part of the projecting wall 181, then combined with the liquid having flowed through the third flow channel part 63 in the fourth flow channel part 64, and then flows upward (in the third direction) between the projecting wall 181 and the right side (the +X side) of the outer circumferential edge part 85.

As described above, the projecting wall 181 is disposed in the fourth flow channel part 64 to detour the liquid having flowed through the second flow channel part 62 in the opposite direction (the first direction) to the upward direction (the third direction). Then, by the projecting wall 181 being disposed in the flow channel 6, the liquid having flowed through the second flow channel part 62 and the liquid having flowed through the third flow channel part 63 are combined in the fourth flow channel part 64, and thus, the rise in temperature of the liquid in the fourth flow channel part 64 is prevented. In other words, the rise in temperature of the light modulation device 341 is further suppressed.

Here, the fact that the rise in temperature of the light modulation device 341 is further suppressed by the projecting wall being disposed will be described compared to the optical device 250 of the third embodiment not provided with the projecting wall 181.

Figure 24:
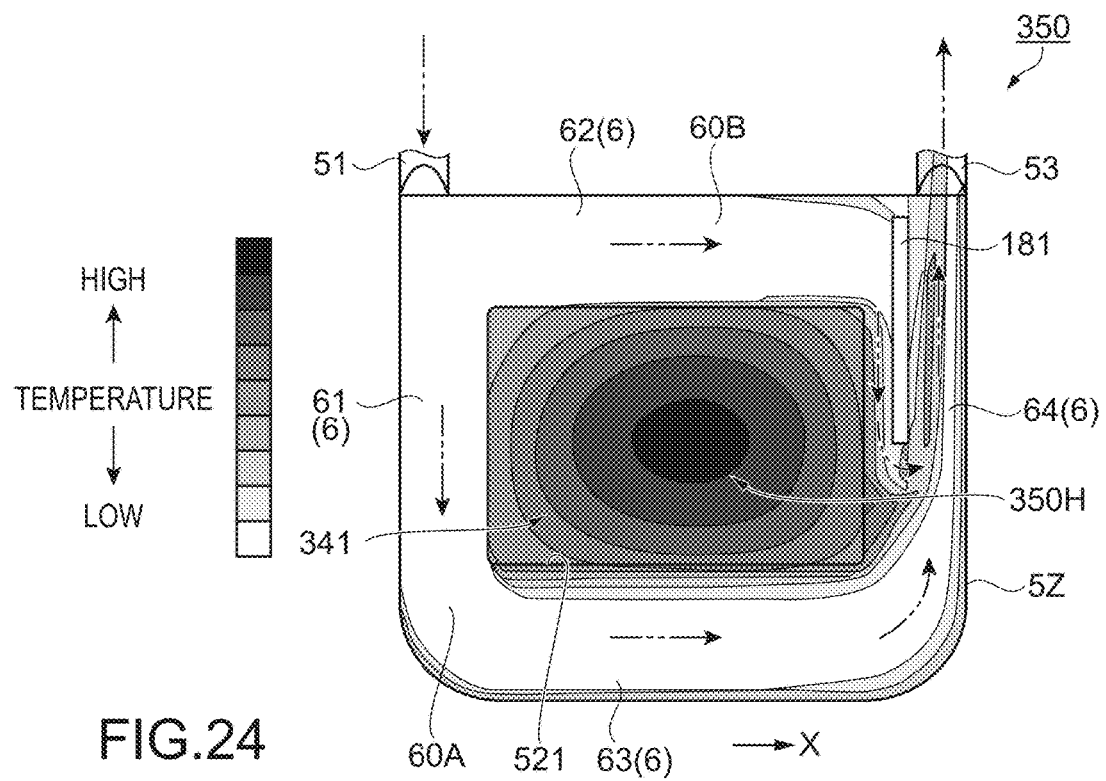
FIG. 24 is a diagram showing a simulation result in the optical device according to the fourth embodiment.

FIG. 24 is a diagram showing a simulation result in the optical device 350 of the present embodiment, and is a diagram showing the temperature of the liquid in the holding section 5Z, and the surface temperature of the light modulation device 341. It should be noted that FIG. 24 is a diagram (a diagram viewed from the opposite side to FIG. 23) of the optical device 350 viewed from the light incident side.

In the optical device 350, since the liquid having flowed through the second flow channel part 62 and the liquid having flowed through the third flow channel part 63 are combined with each other in the fourth flow channel part 64, the temperature of the liquid in the third flow channel part 63 and the fourth flow channel part 64 is lower in the optical device 350 than in the optical device 250 in the third embodiment as shown in FIG. 22 and FIG. 24.

Further, the surface temperature of the light modulation device 341 in the optical device 350 becomes lower than the surface temperature of the light modulation device 341 in the optical device 250 of the third embodiment. Further, in the temperature distribution of the surface of the light modulation device 341, the high temperature range the highest in temperature is smaller in the optical device 350 than in the optical device 250. Specifically, the high temperature range 350H (see FIG. 24) of the light modulation device 341 in the optical device 350 becomes smaller than the high temperature range 250H (see FIG. 22) of the light modulation device 341 in the optical device 250. Further, the high temperature range 350H in the optical device 350 comes closer to the center of the surface of the light modulation device 341 than the high temperature range 250H in the optical device 250 to make the temperature distribution balanced.

As described above, in the optical device 350, since the projecting wall 181 is disposed in the flow channel 6, the liquid having flowed through the second path 60B (the path along the second flow channel part 62) shorter than the first path 60A (the path along the first flow channel part 61, the third flow channel part 63, and the fourth flow channel part 64) enters the posterior stage (the fourth flow channel part 64) of the first path 60A to prevent the rise in temperature of the liquid in the fourth flow channel part 64.

As described hereinabove, according to the optical device 350 related to the present embodiment, the following advantages can be obtained in addition to the advantages 1, 2, and 5 through 9 in the first embodiment.

1. Since the projecting wall 181 is disposed in the flow channel 6 of the holding section 5Z, and the rise in temperature of the liquid in the fourth flow channel part 64 is suppressed, the rise in temperature of the light modulation device 341 can further be suppressed.

2. The temperature distribution of the surface of the light modulation device 341 becomes balanced one in which the high temperature range 350H is close to the center of the surface of the light modulation device 341. Thus, even if there occurs the case in which there occurs the temperature distribution causing the color variation and so on in the image to be projected, it becomes possible for the projector 1 to simplify the image processing for correcting the color variation and so on.

A modified example of the fourth embodiment will hereinafter be described.

Modified Example 1

The projecting wall 181 (the detour part) is configured so as to detour roughly all of the liquid having flowed through the second flow channel part 62 in the fourth embodiment, but can also be configured so that a part of the liquid having flowed through the second flow channel part 62 is detoured. In other words, it is sufficient for the detour part to be configured so that at least a part of the liquid having flowed through the second flow channel part 62 is detoured.

Further, some modified examples common to the first embodiment through the fourth embodiment will hereinafter be described.

Although in the embodiments and the modified examples described above, the light modulation device 341 is configured as the optical element held by the holding section 5, 5X, 5Y, 5Z, 15, 25, 305 through which the liquid circulates, the optical element is not limited to the light modulation device 341, and it is also possible to configure other optical components as the optical element. As the optical element, there can be cited, for example, the incident-side polarization plate 342 and the exit-side polarization plate 343. Further, it is also possible to adopt a configuration in which the optical unit 3 is provided with a wave plate, a compensation element for compensating the phase difference of the light, and so on, and the wave plate, the compensation element, or the like is configured as the optical element.

Although in the embodiments described above, the flow channel forming part 52 is disposed on the light incident side of the light modulation device 341 (the optical element), it is also possible to adopt a configuration provided with a flow channel forming part disposed on the light exit side of the light modulation device 341 (the optical element). Further, it is also possible to adopt a configuration in which flow channel forming parts are disposed on the both sides (the light incident side and the light exit side) of the light modulation device 341 (the optical element).

Although the holding section 5, 5X, 5Y, 5Z, 15, 25, 305 of the embodiments and the modified examples described above is formed of the two members combined with each other, it is also possible to configure the holding section with one member using metal powder or the like and a three-dimensional object shaping device such as a 3D printer. In the case of this configuration, since the inner circumferential edge of the flow channel forming part can be formed thinner than the thickness (the thickness of the first uprise part 71 and the second uprise part 81) thereof in the embodiments described above, it becomes possible to make the flow channel 6 come closer to the optically effective area. Further, since the end part 851 in the embodiments described above becomes unnecessary, it becomes possible to realize the holding section smaller in size.

Although the light modulation device 341 (the optical element) of the embodiments described above is held by the holding section 5, 5X, 5Y, 5Z, 15, 25, 305 using an adhesive, this configuration is not a limitation. For example, it is also possible to adopt a configuration in which there is provided a holding member disposed on the opposite side to the holding section 5, 5X, 5Y, 5Z, 15, 25, 305 of the optical element, and the optical element is held by clamping the optical element with the holding section 5, 5X, 5Y, 5Z, 15, 25, 305 and the holding member.

The entire disclosure of Japanese Patent Application No. 2016-228640, filed Nov. 25, 2016 and No. 2016-228641, filed Nov. 25, 2016 are expressly incorporated by reference herein.

What is claimed is:

1. An optical device comprising:
   an optical element disposed on an optical axis of incident light; and
   a holding section configured to hold the optical element,
   wherein the holding section includes
      an inflow part to which a liquid supplied from an outside of the holding section inflows,
      a flow channel forming part disposed along a circumferential edge of the optical element so as to have an annular shape, and having a flow channel through which the liquid flowed from the inflow part circulates, and
      an outflow part from which the liquid having flowed through the flow channel outflows to the outside of the holding section,
   wherein at least one of an inside of the inflow part and an inside of the flow channel is provided with at least one projection,
   wherein the flow channel forming part is formed so as to surround the optical axis of incident light, and the at least one projection protrudes along the optical axis of incident light,
   wherein a plurality of first projections is disposed along a circulation direction of the liquid,
   wherein a plurality of second projections is disposed along the circulation direction, and is different from the plurality of first projections, and
   wherein the plurality of first projections and the plurality of second projections are arranged so as to be shifted from each other viewed from the circulation direction, and are arranged so as to be shifted from each other viewed from a direction perpendicular to both the circulation direction and a direction in which the plurality of first projections and the plurality of second projections project.

2. An optical device comprising:
   an optical element disposed on an optical axis of incident light; and
   a holding section configured to hold the optical element,
   wherein the holding section includes
      an inflow part to which a liquid supplied from an outside of the holding section inflows,
      a flow channel forming part disposed along a circumferential edge of the optical element so as to have an annular shape, and having a flow channel through which the liquid flowed from the inflow part circulates, and
      an outflow part from which the liquid having flowed through the flow channel outflows to the outside of the holding section,
   wherein at least one of an inside of the inflow part and an inside of the flow channel is provided with at least one projection,
   wherein the flow channel forming part is formed so as to surround the optical axis of incident light, and the at least one projection protrudes along the optical axis of incident light,
   wherein the flow channel includes
      a first flow channel part and a fourth flow channel part disposed so as to be opposed to each other, the first flow channel extending in a first direction, the fourth flow channel extending in a third direction opposite to the first direction, and
      a second flow channel part and a third flow channel part disposed so as to be opposed to each other and extending in a second direction crossing the first direction,
   wherein the first flow channel part, the second flow channel part, the third flow channel part, and the fourth flow channel part are connected so as to form an annular shape, and
   wherein the at least one projection is disposed inside the flow channel.

3. The optical device according to claim 2,
   wherein a plurality of first projections is disposed along a circulation direction of the liquid,
   wherein a plurality of second projections is disposed along the circulation direction, and is different from the plurality of first projections, and
   wherein the plurality of first projections and the plurality of second projections are arranged so as to be shifted from each other viewed from the circulation direction, and are arranged so as to be shifted from each other viewed from a direction perpendicular to both the circulation direction and a direction in which the plurality of first projections and the plurality of second projections project.

4. The optical device according to claim 2,
wherein length of the second flow channel part and length of the third flow channel part are respectively larger than each of length of the first flow channel part and length of the fourth flow channel part, and
wherein the at least one projection is provided to at least one of the second flow channel part and the third flow channel part.

5. The optical device according to claim 1,
wherein the holding section includes a first frame and a second frame disposed so as to be opposed to each other in a direction along the optical axis, and bonded to each other to thereby form the flow channel, and
wherein the at least one projection is provided to one of the first frame and the second frame.

6. The optical device according to claim 5,
wherein the first frame and the second frame are each formed of a thermally-conductive material, and
wherein the at least one projection thermally-conductably contacts with the other of the first frame and the second frame.

7. An optical device comprising:
an optical element disposed on an optical axis of incident light; and
a holding section configured to hold the optical element,
wherein the holding section includes
an inflow part to which a liquid supplied from an outside of the holding section inflows,
a flow channel forming part disposed along a circumferential edge of the optical element so as to have an annular shape, and having a flow channel through which the liquid flowed from the inflow part circulates, and
an outflow part from which the liquid having flowed through the flow channel outflows to the outside of the holding section,
wherein the inflow part and the outflow part are disposed on a same side with respect to the flow channel forming part,
wherein an entirety of the liquid flowed through the flow channel is substantially perpendicular to the optical axis,
wherein the flow channel includes
a first flow channel part configured to circulate, in a first direction, a part of the liquid flowed from the inflow part,
a second flow channel part configured to circulate, in a second direction crossing the first direction, a rest of the liquid flowed from the inflow part,
a third flow channel part configured to circulate, in the second direction, a liquid flowed through the first flow channel part, and
a fourth flow channel part configured to circulate, in a third direction opposite to the first direction, a liquid flowed through the third flow channel part, and
wherein the outflow part outflows a liquid obtained by combining a liquid circulated through the second flow channel part and a liquid circulated through the fourth flow channel part.

8. The optical device according to claim 7,
wherein the second flow channel part includes a narrowed part where the second flow channel part is partially narrowed.

9. The optical device according to claim 7,
wherein the flow channel includes a detour part configured to detour, in the first direction, at least a part of a liquid flowed through the second flow channel part and configured to combine the detoured liquid with a liquid flowing through the fourth flow channel part.

10. The optical device according to claim 1, wherein the optical element is a light modulation device configured to modulate the incident light.

11. The optical device according to claim 7, wherein the optical element is a light modulation device configured to modulate the incident light.

12. A projector comprising:
a light source configured to emit light;
the optical device according to claim 1, which the light emitted from the light source enters;
a projection optical device configured to project an image corresponding to light emitted from the optical device; and
a liquid cooling device configured to circulate the liquid through the optical device.

13. A projector comprising:
a light source configured to emit light;
the optical device according to claim 3, which the light emitted from the light source enters;
a projection optical device configured to project an image corresponding to light emitted from the optical device; and
a liquid cooling device configured to circulate the liquid through the optical device.

14. A projector comprising:
a light source configured to emit light;
the optical device according to claim 2, which the light emitted from the light source enters;
a projection optical device configured to project an image corresponding to light emitted from the optical device; and
a liquid cooling device configured to circulate the liquid through the optical device.

15. A projector comprising:
a light source configured to emit light;
the optical device according to claim 4, which the light emitted from the light source enters;
a projection optical device configured to project an image corresponding to light emitted from the optical device; and
a liquid cooling device configured to circulate the liquid through the optical device.

16. A projector comprising:
a light source configured to emit light;
the optical device according to claim 5, which the light emitted from the light source enters;
a projection optical device configured to project an image corresponding to light emitted from the optical device; and
a liquid cooling device configured to circulate the liquid through the optical device.

17. A projector comprising:
a light source configured to emit light;
the optical device according to claim 6, which the light emitted from the light source enters;
a projection optical device configured to project an image corresponding to light emitted from the optical device; and a liquid cooling device configured to circulate the liquid through the optical device.

18. A projector comprising:

a light source configured to emit light;

the optical device according to claim 7, which the light emitted from the light source enters;

a projection optical device configured to project an image corresponding to light emitted from the optical device; and a liquid cooling device configured to circulate the liquid through the optical device.

* * * * *

UNITED STATES PATENT AND TRADEMARK OFFICE
CERTIFICATE OF CORRECTION

PATENT NO. : 10,372,025 B2
APPLICATION NO. : 15/815286
DATED : August 6, 2019
INVENTOR(S) : Kensaku Matsumoto et al.

Page 1 of 1

It is certified that error appears in the above-identified patent and that said Letters Patent is hereby corrected as shown below:

On the Title Page

At Item (30), second entry, change:
"Nov. 28, 2016 (JP) .............................. 2016-228641"
To:
--Nov. 25, 2016 (JP) .............................. 2016-228641--

Signed and Sealed this
Twenty-second Day of October, 2019

Andrei Iancu
*Director of the United States Patent and Trademark Office*